(12) United States Patent
Ohnuki

(10) Patent No.: US 9,487,095 B2
(45) Date of Patent: Nov. 8, 2016

(54) CHARGING AND DISCHARGING DEVICE

(75) Inventor: Yasumichi Ohnuki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 258 days.

(21) Appl. No.: 14/237,912

(22) PCT Filed: Jul. 19, 2012

(86) PCT No.: PCT/JP2012/068303
§ 371 (c)(1),
(2), (4) Date: Feb. 10, 2014

(87) PCT Pub. No.: WO2013/031412
PCT Pub. Date: Mar. 7, 2013

(65) Prior Publication Data
US 2014/0203778 A1    Jul. 24, 2014

(30) Foreign Application Priority Data

Aug. 26, 2011   (JP) ................................ 2011-184219

(51) Int. Cl.
*H02J 7/00* (2006.01)
*B60L 11/18* (2006.01)
*H01M 10/42* (2006.01)

(52) U.S. Cl.
CPC ............ B60L 11/18 (2013.01); B60L 11/1811 (2013.01); B60L 11/1866 (2013.01); H02J 7/0018 (2013.01); *H01M 10/4207* (2013.01); *H01M 2010/4271* (2013.01); *H01M 2220/20* (2013.01); *Y02T 10/7005* (2013.01);

(Continued)

(58) Field of Classification Search
CPC . B60L 11/18; B60L 11/1866; B60L 11/1811; H02J 7/0018; H01M 2010/4271; H01M 10/4207; H01M 2220/20; Y02T 90/14; Y02T 10/7005; Y02T 10/7061; Y02T 90/127; Y02T 10/7055
See application file for complete search history.

(56) References Cited

U.S. PATENT DOCUMENTS

| | | | | |
|---|---|---|---|---|
| 5,594,320 A | * | 1/1997 | Pacholok | ............. H02J 7/0018 320/103 |
| 2003/0044689 A1 | * | 3/2003 | Miyazaki | ............. H02J 7/0026 429/320 |
| 2010/0231167 A1 | | 9/2010 | Ohnuki | |

FOREIGN PATENT DOCUMENTS

| | | |
|---|---|---|
| CN | 1409884 A | 4/2003 |
| CN | 101841180 A | 9/2010 |

(Continued)

OTHER PUBLICATIONS

Chinese Office Action and Search Report application No. 201280039787.1 issued Jul. 28, 2015.

(Continued)

*Primary Examiner* — Nha Nguyen
(74) *Attorney, Agent, or Firm* — Squire Patton Boggs (US) LLP

(57) ABSTRACT

Provided is a charging and discharging device that does not need to use a high voltage capacitor even if a shielding switch is provided in an assembled battery for the sake of convenience of maintenance, and the like. The charging and discharging device includes: capacitors for connecting control terminals of adjacent circuit blocks, the shielding switch interposed between the adjacent battery modules, and a transformer interposed between the control terminals corresponding to the adjacent battery modules.

2 Claims, 38 Drawing Sheets

(52) U.S. Cl.
CPC ........ *Y02T 10/7055* (2013.01); *Y02T 10/7061* (2013.01); *Y02T 10/7072* (2013.01); *Y02T 90/127* (2013.01); *Y02T 90/14* (2013.01)

(56) References Cited

FOREIGN PATENT DOCUMENTS

| JP | 2006-296036 A | 10/2006 |
|----|---------------|---------|
| JP | 2008-289234 A | 11/2008 |
| JP | 2010-213474 A | 9/2010 |
| JP | 2011-67021 A | 3/2011 |

OTHER PUBLICATIONS

International Search Report dated Aug. 21, 2012 corresponding to International Patent Application No. PCT/JP2012/068303 and English translation thereof.
Guidelines for Electric Vehicle Safety—SAE J2344, Jun. 1998, SAE Information Report (4.3.2.1 Suggested Disconnect Location and Type), pp. 23.590-23.593.

\* cited by examiner

[COMPARATIVE EXAMPLE 1]

[INVENTIVE EXAMPLE 1]

[MODIFICATION A OF INVENTIVE EXAMPLE 1]

FIG. 11 [MODIFICATION B OF INVENTIVE EXAMPLE 1]

[MODIFICATION C OF INVENTIVE EXAMPLE 1]

[MODIFICATION D OF INVENTIVE EXAMPLE 1]

[COMPARATIVE EXAMPLE 2]

[INVENTIVE EXAMPLE 2]

[MODIFICATION A OF INVENTIVE EXAMPLE 2]

[MODIFICATION B OF INVENTIVE EXAMPLE 2]

[COMPARATIVE EXAMPLE 3]

[INVENTIVE EXAMPLE 3]

[MODIFICATION A OF INVENTIVE EXAMPLE 3]

[MODIFICATION B OF INVENTIVE EXAMPLE 3]

[MODIFICATION C OF INVENTIVE EXAMPLE 3]

[MODIFICATION D OF INVENTIVE EXAMPLE 3]

FIG. 36 [MODIFICATION F OF INVENTIVE EXAMPLE 3]

CHARGING AND DISCHARGING DEVICE

TECHNICAL FIELD

The present invention relates to a charging and discharging device for independently adjusting the charge levels of battery modules of a battery assembly, which is made up of a plurality of battery modules connected in series, each of the battery modules comprising at least one cell as a secondary cell.

BACKGROUND ART

Recently, vehicles propelled by at least the drive power of a motor, such as electric vehicles (EV), hybrid electric vehicles (HEV), plug-in hybrid electric vehicles (PHEV), fuel cell vehicles (FCV), or the like, have a battery assembly housed in a battery box, which serves as an electric power source for an electric motor. The battery assembly is made up of a plurality of series-connected battery modules, each of which comprises at least one cell as a secondary cell that is chargeable and dischargeable. The electric motor is energized by a high DC voltage generated by the battery assembly and which is applied through an inverter.

The series-connected battery modules initially are charged to equal levels. However, when the battery modules are repeatedly charged and discharged, the charge levels of the respective battery modules gradually become different from each other as a result of characteristic variations or the like of the battery modules.

Usually, a charging process is performed on the battery assembly. When any one of the battery modules of the battery assembly has reached an upper charge-level limit, the charging process on the battery assembly must be stopped, even if the other battery modules have not yet been fully charged.

On the other hand, when any one of the battery modules of the battery assembly has reached a lower charge-level limit (end-of-discharge voltage) during a discharging process performed on the battery assembly, the discharging process also must be stopped.

As a vehicle carrying such a battery assembly travels over a greater distance, or in other words as the vehicle is used for a longer period of time, the overall series-connected array of battery modules, i.e., the battery assembly, tends to reach the upper charge-level limit or the lower charge-level limit earlier than before, so that the charging capacity of the battery assembly becomes reduced as a practical matter.

In view of the aforementioned drawbacks, techniques have been proposed for uniformizing the remaining capacities of the battery modules that make up a battery assembly, by monitoring voltages that represent the remaining capacities of the battery modules, discharging battery modules that have relatively high voltages, and charging battery modules that have relatively low voltages with the discharged electric power. See, Japanese Laid-Open Patent Publication No. 2010-213474 (JP2010-213474A) (Abstract, FIGS. 1, 2, and 3) and Japanese Laid-Open Patent Publication No. 2011-067021 (JP2011-067021A) (Abstract, FIGS. 2, 9, and 10).

According to the techniques disclosed in JP2010-213474A and JP2011-067021A, AC generating circuit blocks and DC generating circuit blocks are connected to the battery modules of the battery assembly, and the circuit blocks are interconnected by capacitors (JP2010-213474A) or by series-connected circuits made up of capacitors and inductors (JP2011-067021A) for adjusting the charge levels of the respective battery modules.

For facilitating maintenance and servicing of battery assemblies, it has been recommended to provide a manual cutoff switch at a central point, for thereby halving the voltage across a battery assembly made up of series-connected battery modules. See, GUIDELINES FOR ELECTRIC VEHICLE SAFETY—SAE J 2344 JUN 1998 (4.3.2.1 Suggested Disconnect Location and Type).

SUMMARY OF INVENTION

FIG. 37 of the accompanying drawings shows a schematic circuit diagram of a charging and discharging system 101 disclosed in JP2010-213474A. As shown in FIG. 37, a load 106 is connected across a battery assembly 102, which is made up of a plurality (four are shown for easier understanding) of series-connected battery modules 104. As shown in FIG. 38 of the accompanying drawings, when a cutoff switch 108, which is positioned in the middle of the battery assembly 102 and connected in series to the battery modules 104, is opened, a reversed value of a combined voltage 4×V0 (actually, several hundred volts) of the battery assembly 102 is applied between voltage detecting wires 110, 112, which are connected respectively to both sides of the switch 108 through diodes D2 of charging and discharging circuit blocks 105, to be described later. A high voltage is applied to a capacitor C2 (4×V0−V0=3V0, actually, several hundred volts), which represents a difference produced by subtracting the voltage V0 (actually, several volts) of one of the battery modules 104 (the battery module 104 the positive terminal of which is connected to a common terminal of the switch 108 shown in FIG. 38) from the combined voltage 4×V0.

According to the invention disclosed in JP2011-067021A, since the capacitors are replaced with series-connected circuits made up of capacitors and inductors, a high voltage similarly is applied to the capacitor when the cutoff switch is opened.

Consequently, the capacitor C2 is required to be a component that has a high withstand voltage capability.

However, since high withstand voltage capacitors are expensive and constituted by large circuit components, an obstacle is presented with respect to efforts to make the entire device smaller in scale and lower in cost, including efforts to maintain a creepage distance on the board.

The present invention has been made in view of the aforementioned problems. It is an object of the present invention to provide a charging and discharging device, which does not require the use of a high withstand voltage capacitor, even though the battery assembly includes a cutoff switch for facilitating maintenance thereof.

According to the present invention, there is provided a charging and discharging device for independently adjusting charge levels of battery modules of a battery assembly, which is made up of a plurality of the battery modules connected in series, each of the battery modules comprising at least one cell, the charging and discharging device comprising circuit blocks connected respectively between positive and negative terminals of the battery modules, the circuit blocks having respective positive terminals and negative terminals connected respectively to the battery modules, AC generating circuits connected respectively to the positive terminals and the negative terminals for generating AC voltages using the battery modules as electric power sources, rectifying circuits for rectifying the AC voltages, control terminals interconnecting respective outputs of the AC generating circuits and respective inputs of the rectifying circuits, the AC voltages being applied respectively to the control terminals, switching elements for selectively connecting and disconnecting at least the positive terminals or the negative terminals and respective output terminals of the rectifying circuits, capacitors interconnecting the control terminals of adjacent ones of the circuit blocks, a current cutoff switch interposed between at least one pair of adjacent ones of the battery modules, and an isolating transformer interposed between the control terminals that correspond to the adjacent ones of the battery modules.

According to the present invention, when the cutoff switch, which is interposed between at least one pair of adjacent battery modules, is opened, a high voltage is prevented from being applied to the capacitors by a galvanically isolating action of the isolating transformer, which is interposed between the control terminals that correspond to the adjacent battery modules. Therefore, even though the charging and discharging device includes the cutoff switch, there is no need to use high withstand voltage capacitors. Capacitors connected to the isolating transformer may be dispensed with, insofar as the isolating transformer is capable of transmitting AC electric power.

The AC generating circuits generate other AC voltages, which are inverted in phase with respect to the AC voltages, the circuit blocks have other control terminals for supplying the other AC voltages, the rectifying circuits full-wave-rectify voltages applied between the control terminals and the other control terminals, wherein the other control terminals of the adjacent ones of the circuit blocks are interconnected by other capacitors, and the isolating transformer includes primary and secondary windings having ends connected to the control terminals and other ends connected to the other control terminals.

According to the present invention, when one battery module is discharged and another battery module is charged, charging efficiency is increased by way of full-wave rectification.

The control terminals are connected to the ends of the primary and secondary windings of the isolating transformer through inductors that are connected in series with the capacitors, and the other control terminals are connected to the other ends of the primary and secondary windings of the isolating transformer through inductors that are connected in series with the other capacitors. If one battery module is discharged while another battery module is charged, an electric path may comprise a series resonant path, which is made up of the series-connected capacitors and inductors. AC generating circuits, which exhibit a series resonant frequency equivalent to that of the series resonant path, are effective to reduce electric power transmission loss.

According to the present invention, when the cutoff switch, which is interposed between at least one pair of adjacent battery modules, is opened, a high voltage is prevented from being applied to the capacitors by a galvanically isolating action of the isolating transformer, which is interposed between the control terminals that correspond to the adjacent battery modules. Therefore, even though the charging and discharging device includes the cutoff switch, there is no need to use high withstand voltage capacitors.

DESCRIPTION OF EMBODIMENTS

Figure 1:
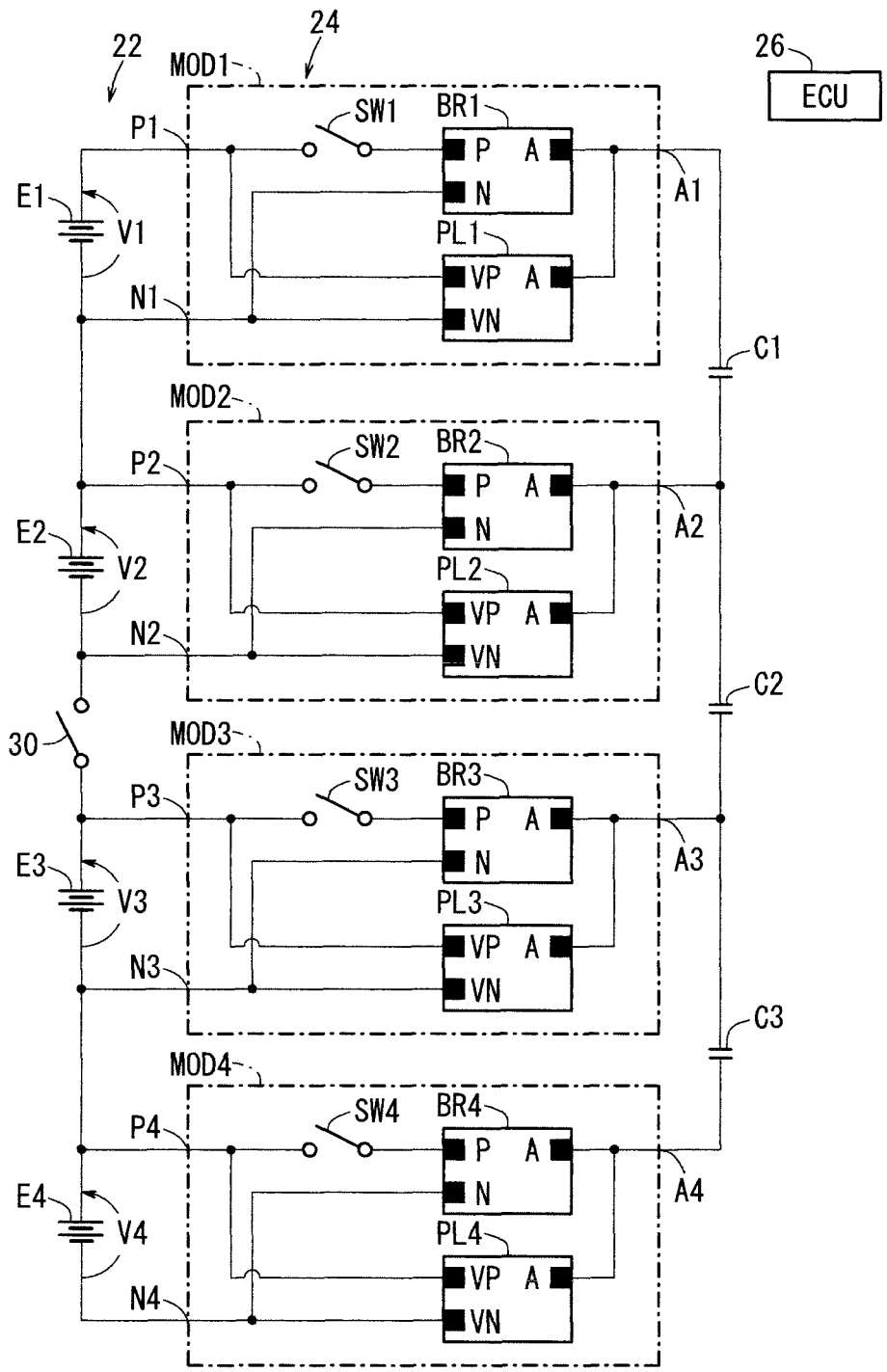
FIG. 1 is a circuit diagram showing an arrangement according to Comparative Example 1.

Charging and discharging devices according to embodiments of the present invention will be described below under respective topics given in the following order with reference to the drawings.
1. Description of Arrangement and Operations of Comparative Example 1;
2. Description of Arrangement and Operations of Inventive Example 1 and Modifications;
3. Description of Arrangement and Operations of Comparative Example 2;
4. Description of Arrangement and Operations of Inventive Example 2 and Modifications;
5. Description of Arrangement and Operations of Comparative Example 3;
6. Description of Arrangement and Operations of Inventive Example 3.

For the sake of brevity and for facilitating understanding of the present invention, in the drawings below, it will be assumed that a battery assembly, which includes a number of series-connected battery modules and has several hundred volts, for example, applied thereacross, is made up of four series-connected battery modules.

[1. Description of Arrangement and Operations of Comparative Example 1]

FIG. 1 is a circuit diagram showing an arrangement according to Comparative Example 1.

As shown in FIG. 1, a charging and discharging system 20 includes a battery assembly 22 made up of battery modules E1, E2, E3, E4 (also referred to representatively as "battery modules En"), each of which is made up of at least one cell as a secondary cell, and a charging and discharging device 24 for charging and discharging the battery modules En. The charging and discharging device 24 discharges battery cells En having high charge voltages, and using the discharged electric power, charges other battery cells En having low charge voltages.

The cell that makes up each of the battery modules En comprises a secondary cell such as a lithium ion cell, for example. The battery modules En are constructed according to the same standards. In FIG. 1, the battery modules E1, E2, E3, E4, the rated voltage values of which are equal to each other, have respective voltages referred to as voltages V1, V2, V3, V4, respectively, for facilitating understanding.

The charging and discharging device 24 has circuit blocks (also referred to as "control modules") MOD1, MOD2, MOD3, MOD4 (also referred to representatively as "circuit blocks MODn") corresponding respectively to the battery modules E1, E2, E3, E4 as measuring objects, a plurality of capacitors C1, C2, C3 (also referred to representatively as "Cn"), and an ECU (Electronic Control Unit) as a controller for controlling various components of the charging and discharging device 24.

The ECU 26, which comprises a computer including a microcomputer, has a CPU (Central Processing Unit), a ROM (including an EEPROM) that serves as a memory, a RAM (Random Access Memory), input/output devices such as an A/D converter, a D/A converter, etc., and a timer that serves as a time measuring section. The CPU reads and executes a program recorded in the ROM to thereby function as various function performing entities (function performing means), e.g., a controller, an arithmetic unit, a driver, a processor, etc.

The circuit blocks MOD1, MOD2, MOD3, MOD4 have respective switching elements SW1, SW2, SW3, SW4 (also referred to representatively as "SWn"), respective rectifying circuits BR1, BR2, BR3, BR4 (also referred to representatively as "BRn"), and respective AC generating circuits PL1, PL2, PL3, PL4 (also referred to representatively as "PLn").

The circuit blocks MOD1, MOD2, MOD3, MOD4 include respective positive terminals P1, P2, P3, P4 (also referred to representatively as "Pn") connected to respective positive terminals of the battery modules E1, E2, E3, E4, and respective negative terminals N1, N2, N3, N4 (also referred to representatively as "Nn") connected to respective negative terminals of the battery modules E1, E2, E3, E4. For facilitating understanding, the positive terminals Pn of the circuit blocks MODn will also be referred to as positive terminals Pn of the battery modules En, in view of the fact that the positive terminals Pn of the circuit blocks MODn are connected in common with the positive terminals of the battery modules En. In addition, the negative terminals Nn of the circuit blocks MODn will be referred to as negative terminals Nn of the battery modules En, in view of the fact that the negative terminals Nn of the circuit blocks MODn are connected in common with the negative terminals of the battery modules En.

The positive terminal P1 of the circuit block MOD1 is connected to a terminal of the switching element SW1 and to a positive input terminal VP of the AC generating circuit PL1. The negative terminal N1 of the circuit block MOD1 is connected to a negative input terminal VN of the AC generating circuit PL1 and to a negative terminal N of the rectifying circuit BR1. The other terminal of the switching element SW1 is connected to a positive terminal P of the rectifying circuit BR1. An AC input terminal A of the rectifying circuit BR1 and an AC output terminal A of the AC generating circuit PL1 are connected respectively to a control terminal A1 of the circuit block MOD1. For the sake of brevity, the input terminal A of the rectifying circuit BR1 and the AC output terminal A of the AC generating circuit PL1 are denoted by the same alphabetical letter "A".

The circuit blocks MOD2, MOD3, MOD4 have the same structures and connections as the circuit block MOD1.

The capacitor C1 is connected between the control terminal A1 of the circuit block MOD1 and the control terminal A2 of the circuit block MOD2. The capacitor C2 is connected between the control terminal A2 of the circuit block MOD2 and the control terminal A3 of the circuit block MOD4. Similarly, the capacitor C3 is connected between the control terminal A3 of the circuit block MOD3 and the control terminal A4 of the circuit block MOD4.

Figure 2:
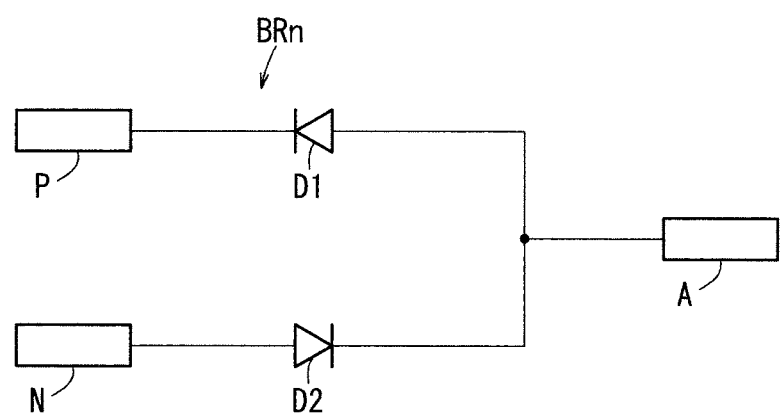
FIG. 2 is a circuit diagram of a rectifying circuit according to Comparative Example 1 and Inventive Example 1.

FIG. 2 is an internal circuit diagram of each of the rectifying circuits BRn shown in FIG. 1 (the illustrated diagram also is applicable to Inventive Example 1, to be described later). The rectifying circuit BRn includes two diodes D1, D2. An anode terminal of the diode D1 and a cathode terminal of the diode D2 are connected to the AC input terminal A. A cathode terminal of the diode D1 is connected to the positive terminal P, and an anode terminal of the diode D2 is connected to the negative terminal N.

The rectifying circuit BR rectifies an alternating current that flows through the AC input terminal A, by allowing a current to flow from the AC input terminal A through the diode D1 to the positive terminal P, and by allowing a current to flow from the negative terminal N through the diode D2 to the AC input terminal A.

Figure 3:
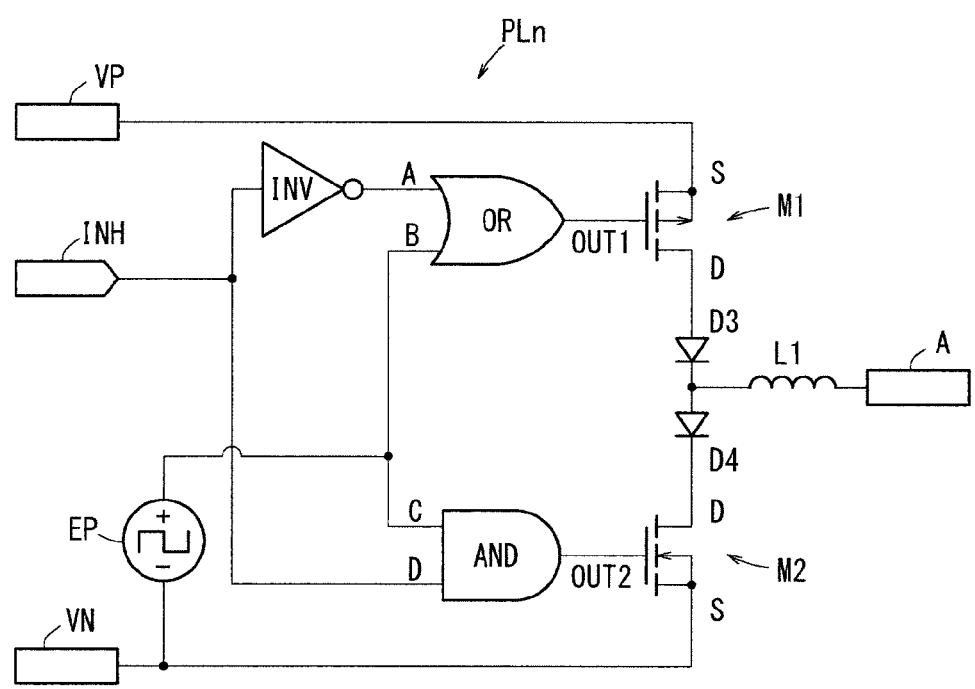
FIG. 3 is a circuit diagram of an AC generating circuit according to Comparative Example 1 and Inventive Example 1.

FIG. 3 is an internal circuit diagram of each of the AC generating circuits PLn shown in FIG. 1. The AC generating circuit PLn includes an AND gate, an OR gate, an inverter INV, a p-MOS transistor M1, an n-MOS transistor M2, diodes D3, D4, an inductor L1 formed by wires, etc., and a rectangular-wave power supply (rectangular-wave generating power supply) EP.

Since the inductor L1 serves to suppress high-frequency waveform components, the inductor L1 may occasionally be replaced with a wiring inductance.

The positive input terminal VP, which is used as a positive power supply for the AND gate, the OR gate, and the inverter INV, is connected to a source terminal (denoted by the alphabetical letter "S") of the p-MOS transistor M1. The negative input terminal VN, which is used as a negative power supply for the AND gate, the OR gate, and the inverter INV, is connected to a source terminal of the n-MOS transistor M2.

The p-MOS transistor M1 has a drain terminal (denoted by the alphabetical letter "D") connected through a series-connected circuit of the diodes D3, D4 to a drain terminal of the n-MOS transistor M2. The junction between the diodes D3, D4 is connected through the inverter INV to the AC output terminal A.

The rectangular-wave power supply EP is connected to an input B of the OR gate and to an input C of the AND gate. An inhibit terminal INH is connected to an input D of the AND gate and to an input of the inverter INV. The inverter INV has an output connected to an input A of the OR gate. The OR gate has an output OUT1 connected to a gate terminal of the p-MOS transistor M1, and the AND gate has an output OUT2 connected to a gate terminal of the n-MOS transistor M2.

The AC generating circuit PLn, which has the above circuit arrangement, is rendered active when the inhibit terminal INH is at a high level. More specifically, when the input A of the OR gate is at a low level and the input D of the AND gate is at a high level, the p-MOS transistor M1 and the n-MOS transistor M2 are turned on and off alternately depending on the voltage transition of the rectangular-wave power supply EP, i.e., as exhibited by repetitive potentials of high and low levels at the input B of the OR gate and the input C of the AND gate.

The AC generating circuit PLn generates an AC voltage (rectangular-wave AC voltage), which represents the potential of the AC output terminal A as it changes between the potential at the positive input terminal VP and the potential at the negative input terminal VN. The AC generating circuit PLn passes (draws in or draws out) a rectangular-wave current through the AC output terminal A. The inductor L serves to limit changes in current during transitioning of the potential at the AC output terminal A.

As shown in FIG. 1, the charging and discharging system 20 includes a current cutoff switch (cutoff switch) 30, which is interposed (disposed) in series between at least one pair of adjacent battery modules En, i.e., the battery module E2 and the battery module E3. According to the present embodiment, the battery module E2 and the battery module E3 serve as central potentials.

The charging and discharging system 20, which is constructed in the foregoing manner according to Comparative Example 1, is incorporated in a vehicle such as an electric vehicle (EV) or the like, including a motor (electric motor) connected through an inverter (bidirectional DC/AC converting circuit) between a maximum-potential end of the battery assembly 22, i.e., the positive terminal P1 of the battery module E1, and a minimum-potential end of the battery assembly 22, i.e., the negative terminal N1 of battery module E4. The inverter and the motor act as a load on the battery assembly 22. During traveling of the vehicle, the battery assembly 22 is charged by regenerated electric power from the motor. While the vehicle is parked, the battery assembly 22 is charged through an electric charger from an external power supply.

In addition to being installed in an electric vehicle (EV), the charging and discharging system 20 may also be installed and used in a vehicle that is propelled by drive power from a motor, a hybrid electric vehicle (HEV), a plug-in hybrid electric vehicle (PHEV), a fuel cell vehicle (FCV), or the like.

Charging and discharging devices according to Comparative Example 2, Inventive Examples 1 through 3, and Modifications thereof, may also be installed and used in the vehicles described above.

Operations of the charging and discharging device according to Comparative Example 1 will be described with respect to a charging and discharging process for discharging one of the battery modules En, e.g., the battery module E4, and charging another of the battery modules En apart from the battery module E4, e.g., the battery module E1, while the cutoff switch 30 is closed. In this case, the charge voltage (charge level) of the battery module E4 is higher than the charge voltage (charge level) of the battery module E1.

The ECU 26 turns on the switching element SW1 of the battery module E1, and turns off the switching elements SW2, SW3, SW4.

Next, the ECU 26 renders the inhibit terminals INH of the circuit blocks MOD1 through MOD3 low in level, while rendering only the inhibit terminal INH of the circuit block MOD4 high in level, thereby operating (activating) only the AC generating circuit PL4.

Upon operation of the AC generating circuit PL4, the potential at the AC output terminal A alternates (transitions) between the potential at the positive terminal P4 and the potential at the negative terminal N4 of the battery module E4.

Figure 4:
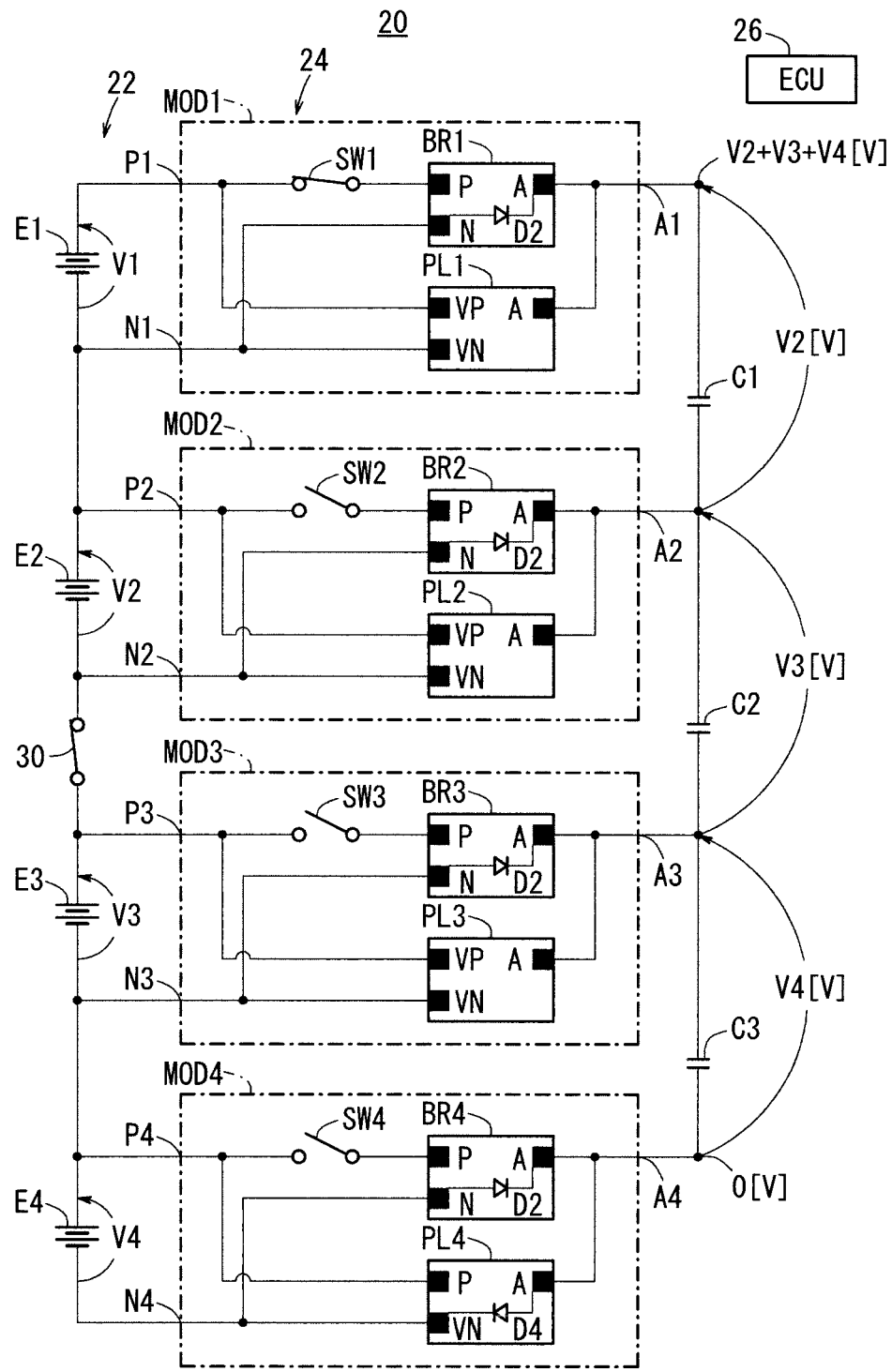
FIG. 4 is a diagram (part 1) illustrating an operation process for discharging a battery module and charging another battery module according to Comparative Example 1 and Inventive Example 1.

With the AC generating circuit PL4 being operated in the foregoing manner, as shown in FIG. 4, the diodes D2 of the rectifying circuits BR1, BR2, BR3 are temporarily rendered conductive, and the diode D4 of the AC generating circuit PL4 is temporarily rendered conductive, thereby charging the capacitors C1, C2, C4. When the potential at the control terminal A4 becomes the same as the potential (0 [V] in FIG. 4) at the negative terminal N4 of the battery module E4, the charge voltage across the capacitor C3 is substantially equal to the voltage V4 of the battery module E4 (note that the potential V4 at the positive terminal P4 of the battery module E4 is applied, through the negative terminal N3 of the circuit block MOD3 and the diode D2 of the rectifying circuit BR3, as the potential at the control terminal A3). Further, the charge voltage across the capacitor C2 is substantially equal to the voltage V3 of the battery module E3, and the charge voltage across the capacitor C1 is substantially equal to the voltage V2 of the battery module E2.

Figure 5:
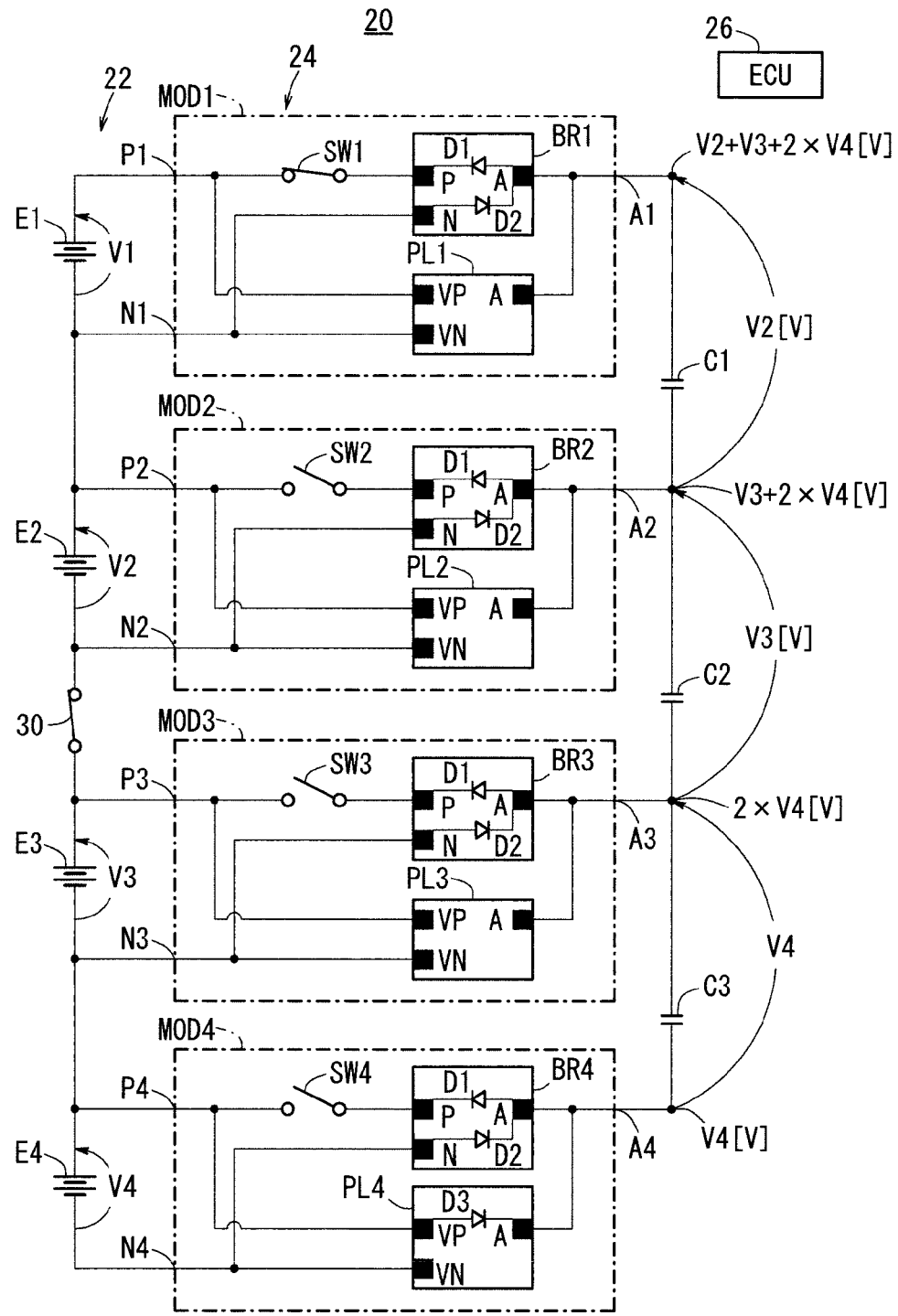
FIG. 5 is a diagram (part 2) illustrating an operation process for discharging a battery module and charging another battery module according to Comparative Example 1 and Inventive Example 1.

As shown in FIG. 5, when the potential at the control terminal A4 transitions from the potential at the negative terminal N4 of the battery module E4 to the potential at the positive terminal P4, i.e., the voltage V4 [V], current does not flow into the control terminals A2, A3. Accordingly, the battery modules E1, E2, E3 are charged through the control terminal A1, the rectifying circuit BR1 (diode D1), the switching element SW1, and the positive terminal P1, under the voltage V2+V3+2×V4 and across the series-connected circuit made up of the capacitors C1, C2, C3.

Then, as shown in FIG. 4, when the potential at the control terminal A4 transitions from the potential V4 [V] at the positive terminal P4 to the potential 0 [V] at the negative terminal N4, the battery modules E2, E3, E4 charge the capacitors C1, C2, C3.

The capacitor C3 is charged via a route that runs from the positive terminal P4 of the battery module E4, through the diode D2 of the rectifying circuit BR3, the capacitor C3, and the diode D4, to the negative terminal N4 of the battery module E4. The capacitor C2 is charged via a route that runs from the positive terminal P4 of the battery module E4, through the battery module E3, the cutoff switch 30, the diode D2 of the rectifying circuit BR2, the capacitor C2, the capacitor C3, and the diode D4, to the negative terminal N4 of the battery module E4. The capacitor C1 is charged via a route that runs from the positive terminal P4 of the battery module E4, through the battery module E3, the diode D2 of the rectifying circuit BR1, the capacitor C1, the capacitor C2, and the capacitor C3, to the negative terminal N4 of the battery module E4.

Subsequently, the state shown in FIG. 5 and the state shown in FIG. 4 are repeated alternately in order to charge and discharge the battery modules E2, E3, so as to discharge the battery module E4 while charging the battery module E1. In other words, the battery module E4 is discharged, and the battery module E1 is charged with the electric power discharged therefrom.

The charging and discharging device 20 operates in a similar manner in other combinations. For example, if the voltage of the battery module E2 is low and the voltage of the battery module E3 is high, the ECU 26 turns on the switching element SW2 and turns off the switching elements SW1, SW3, SW4 in order to operate the AC generating circuit PL3.

In this case, the potential at the control terminal A3 of the circuit block MOD3 alternates between the potential at the positive terminal P3 and the potential at the negative terminal N3 of the battery module E3. At this time, a charging current flows into the battery module E3 through the capacitor C2, the rectifying circuit BR2, and the switching element SW2. Therefore, the battery module E3 is discharged, whereas the battery module E2 is charged.

As described above, when the cutoff switch 30 is closed, according to Comparative Example 1, the charging and discharging device 24 discharges one of the battery modules En, the charge voltage of which is relatively high, and charges another one of the battery modules En, the charge voltage of which is relatively low.

Figure 6:
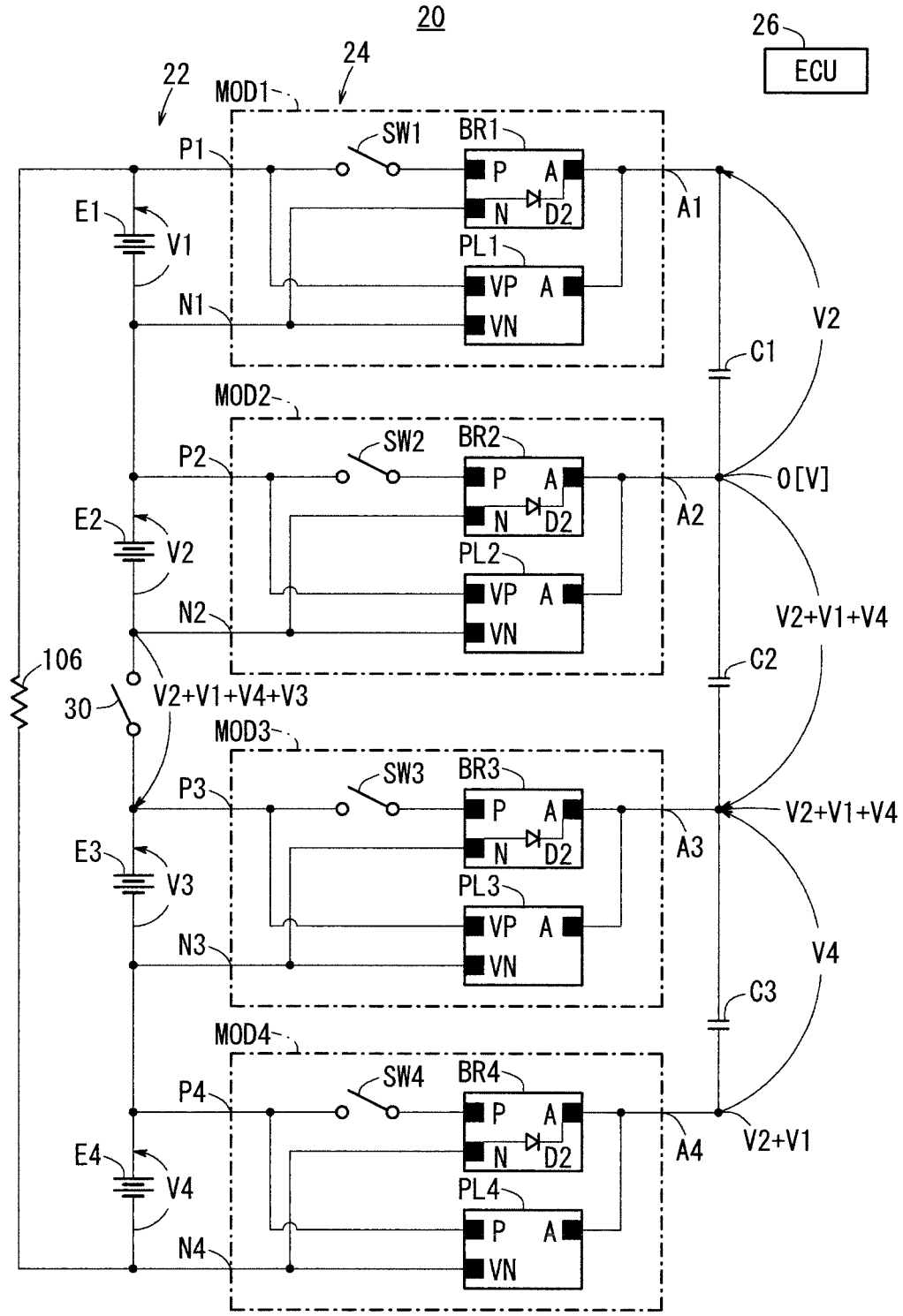
FIG. 6 is a diagram illustrating problems of Comparative Example 1.
Figure 37:
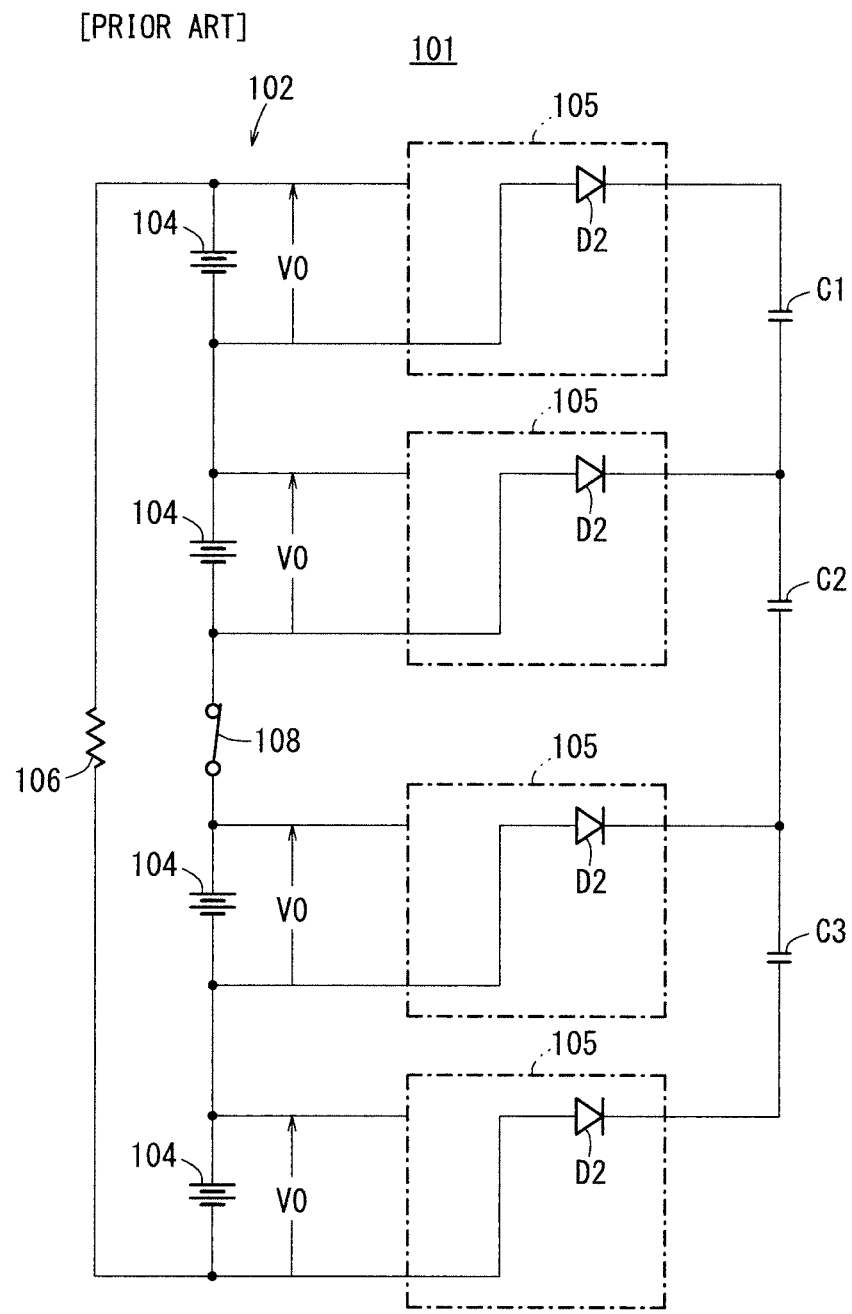
FIG. 37 is a diagram (part 1) illustrating problems of the background art.
Figure 38:
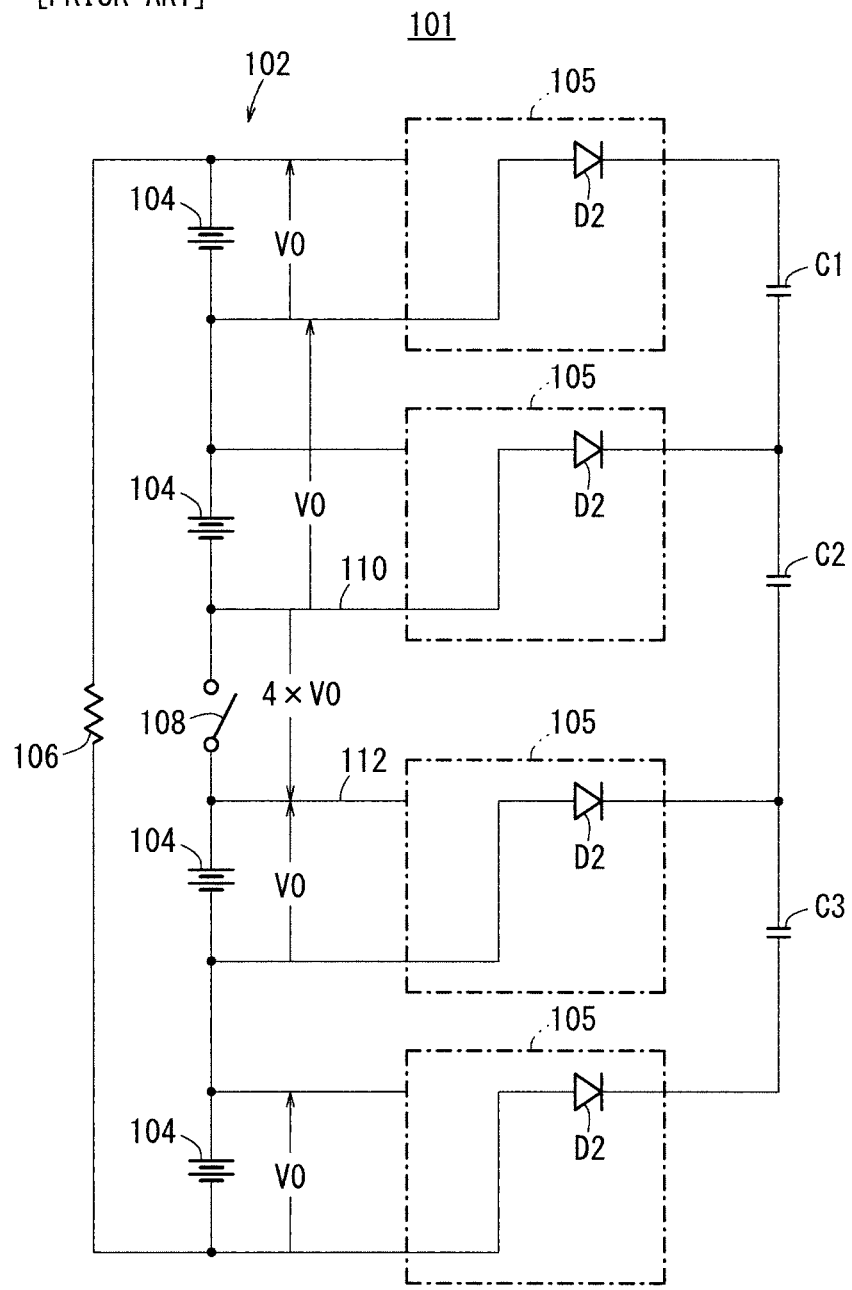
FIG. 38 is a diagram (part 2) illustrating problems of the background art.

However, the charging and discharging device 24 according to Comparative Example 1 experiences problems, as have been described above with reference to FIGS. 37 and 38. As shown in FIG. 6, which illustrates applied voltages, if a load 106 is connected between a maximum potential of the battery assembly 22 (in FIG. 1, the potential V1+V2+V3+V4 [V], which appears at the positive terminal P1 of the battery module E1) and a minimum potential of the battery assembly 22 (in FIG. 1, the potential 0 [V], which appears at the negative terminal N4 of the battery module E4), then when the cutoff switch 30 is opened, a reversed value of V2+V1+V4 is applied to the capacitor C2. Actually, since there are several battery modules En, if the combined voltage thereof is several hundred V, then almost all of the reversed value is applied to the capacitor C2.

Arrangements and operations of Inventive Example and Modifications thereof, which do not require a high withstand voltage capacitor as the capacitor C2 in spite of the fact that the battery assembly 22 includes the cutoff switch 30, will be described below.

Components shown in the figures referred to below, which correspond to those shown in FIGS. 1 through 6, are denoted by identical reference characters, and such features will not be described in detail below.

[2. Description of Arrangement and Operations of Inventive Example 1 and Modifications]

Figure 7:
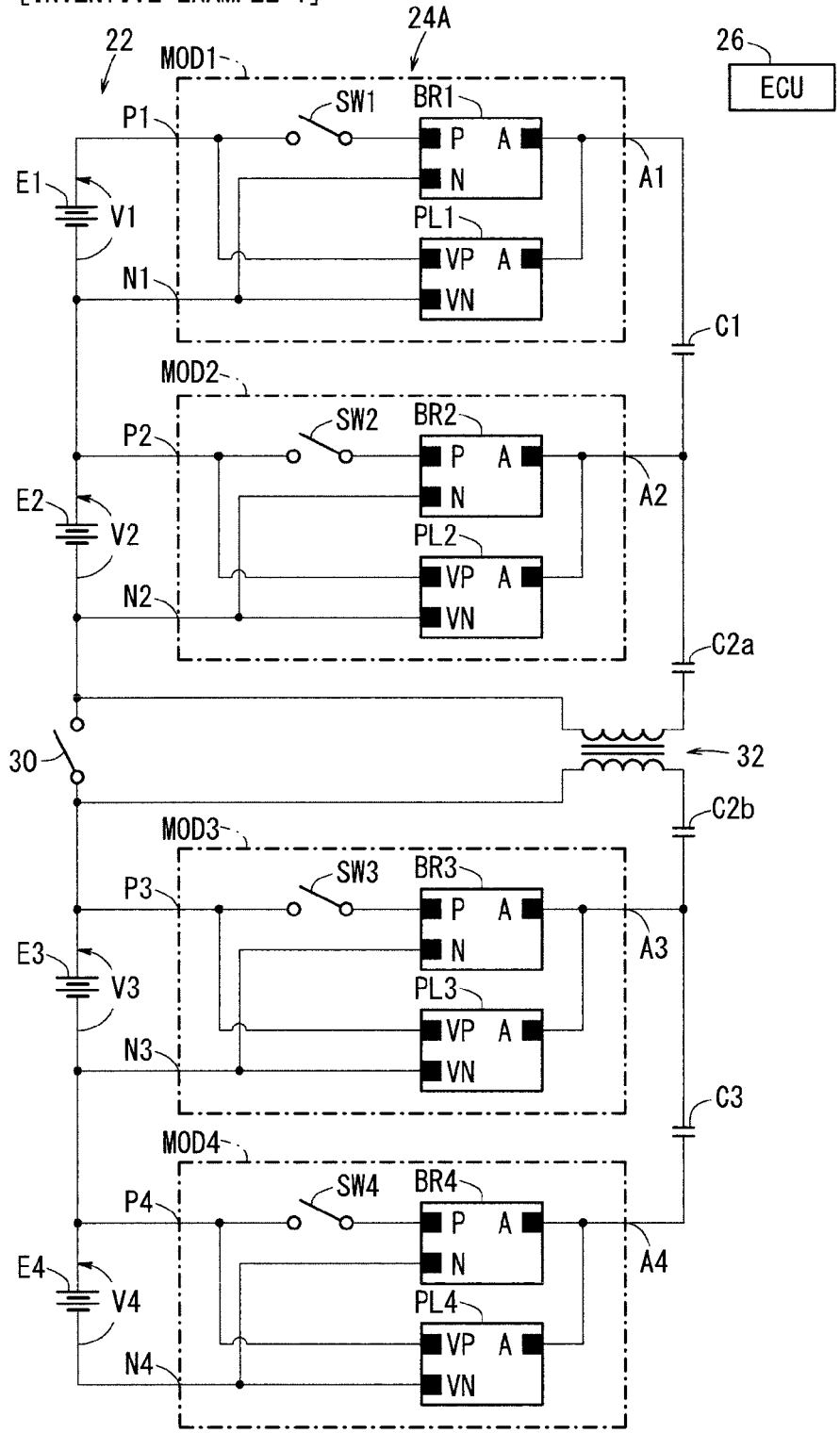
FIG. 7 is a circuit diagram of a charging and discharging device according to Inventive Example 1.

FIG. 7 is a circuit diagram of a charging and discharging system 20A including a charging and discharging device 24A according to Inventive Example 1.

The charging and discharging device 24A according to Inventive Example 1 differs from the charging and discharging device 24 according to Comparative Example 1, in that the capacitor C2 interconnecting the control terminal A2 of the circuit block MOD2 and the control terminal A3 of the circuit block MOD3 is replaced with two series-connected capacitors, i.e., a capacitor C2a and a capacitor C2b. In addition, a transformer 32 (isolating transformer) is connected between the two capacitors C2a, C2b. The electrostatic capacitance of each of the capacitors C2a, C2b is twice the electrostatic capacitance of the capacitor C2, for example.

The transformer 32 includes a primary winding having one end connected to the capacitor C2a and another end connected to the negative terminal N2 of the battery module E2, which is connected in common with the fixed contact of the cutoff switch 30. The transformer 32 also includes a secondary winding having one end connected to the capacitor C2b and another end connected to the positive terminal P3 of the battery module E3, which is connected in common with the movable contact of the cutoff switch 30.

Figure 8:
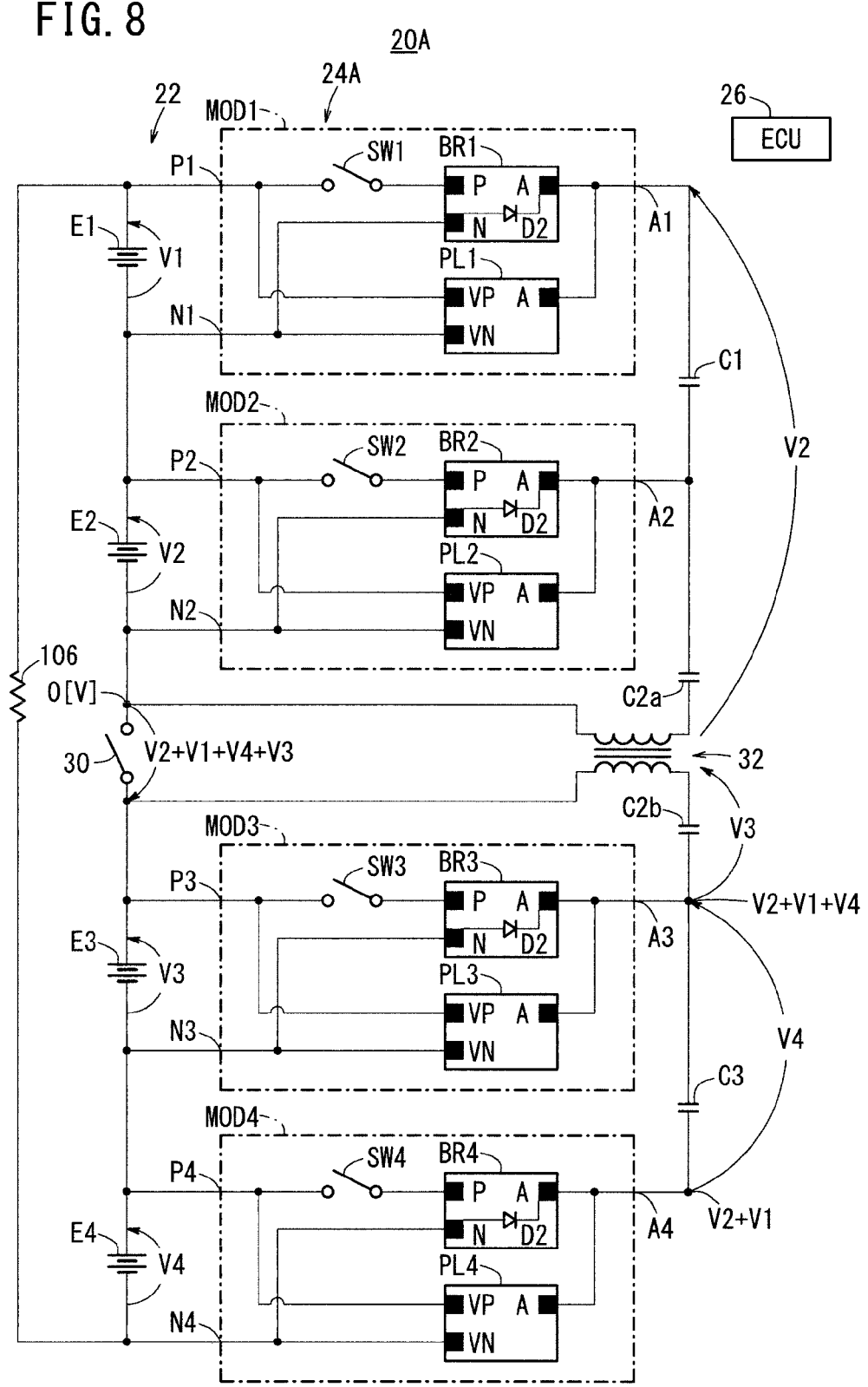
FIG. 8 is a circuit diagram of a circuit according to Inventive Example 1, illustrating an operation process for solving problems of Comparative Example 1.

With the arrangement shown in FIG. 7, when the cutoff switch 30 is opened as shown in FIG. 8, a route for transmission of an alternating current is galvanically separated (isolated), so that only the voltage V2 of the battery module E2 is applied to the capacitor C2a, and no higher voltage is applied to the capacitor C2a. Further, only the voltage V3 of the battery module E3 is applied to the capacitor C2b, and no higher voltage is applied to the capacitor C2b.

Since the capacitors C2a, C2b are connected in series to respective windings of the transformer 32, a direct current does not flow through the windings of the transformer 32, regardless of the output states of the AC generating circuits PLn.

An AC process for discharging one of the battery modules En, a voltage Vn of which is relatively high, and charging another one of the battery modules En, a voltage Vn of which is relatively low, is the same as the above-described process of Comparative Example 1, based on the assumption that the charging and discharging device 24A includes the transformer 32 directly connected thereto (i.e., is transformer-coupled).

Figure 9:
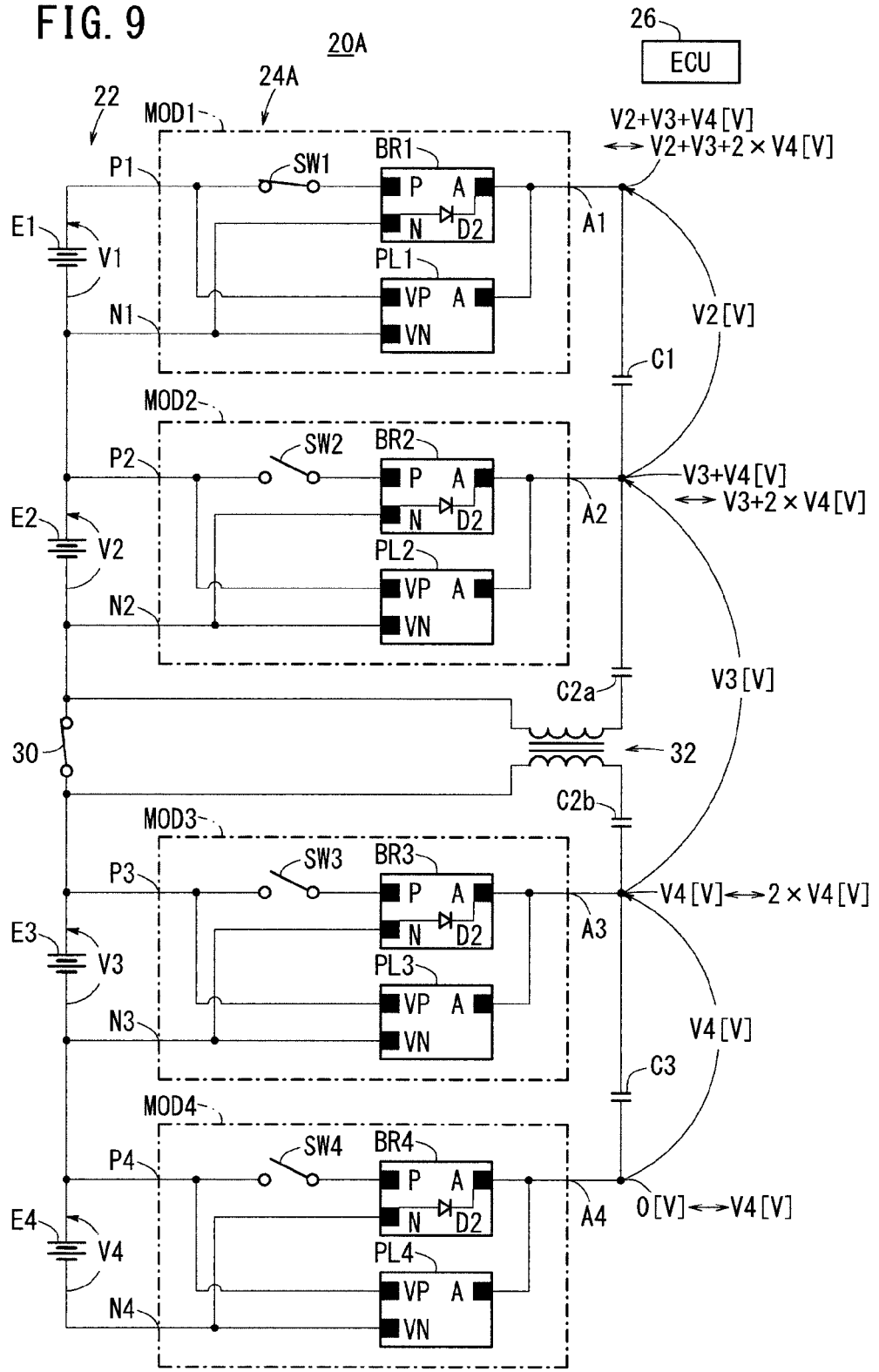
FIG. 9 is a diagram illustrating a charging and discharging process according to Inventive Example 1.

For example, if the AC generating circuit PL4 is operated while the cutoff switch 30 and the switching element SW1 are closed, as shown in the process diagram of FIG. 9, a repetitive square wave, which changes between 0 [V] and V4 [V], is generated at the control terminal A4, a repetitive square wave, which changes between V4 [V] and 2×V4 [V], is generated at the control terminal A3, a repetitive square wave, which changes between V3+V4 [V] and V3+2×V4 [V], is generated at the control terminal A2, and a repetitive square wave, which changes between V2+V3+V4 [V] and V2+V3+2×V4 [V], is generated at the control terminal A1. Consequently, the battery module E4 is discharged, whereas the battery module E1 is charged.

In order to allow the charging and discharging device 24A to operate uniformly with respect to both charging and discharging directions for the capacitors C2a, C2b, the transformer 32 preferably has a winding ratio of 1:1.

The transformer 32 preferably has a primary inductance and a secondary inductance, which are selected to make the impedance sufficiently large with respect to the oscillating frequency of the AC generating circuits PLn, in order to minimize distortions (droop) of an AC waveform (particularly, middle-range and low-range portions of the repetitive square wave) transmitted bidirectionally through the transformer 32 between the primary and secondary windings. Stated otherwise, the transformer 32 is operated as an ideal transformer, for thereby transmitting an AC signal having a repetitive square wave between the primary and secondary windings while the waveform thereof remains unchanged.

According to Inventive Example 1, the transformer 32 is inserted in parallel with the cutoff switch 30. If an additional cutoff switch is connected between other battery modules En, then another transformer may be inserted in parallel with the additional cutoff switch, thereby dividing the corresponding capacitor into two series-connected capacitors. This feature also is applicable to the following examples described below.

[Overview of Arrangement and Advantages of Inventive Example 1]

As shown in FIG. 8, the charging and discharging device 24A according to Inventive Example 1, which independently adjusts the charge levels of the battery modules En of a battery assembly 22 made up of such battery modules En connected in series, each of the battery modules En comprising at least one cell as a secondary cell, includes circuit blocks MODn connected respectively between positive and negative terminals of the battery modules En, the circuit blocks MODn having respective positive terminals Pn and negative terminals Nn connected respectively to the battery modules En, AC generating circuits PLn connected respectively to the positive terminals Pn and the negative terminals Nn for generating AC voltages using the battery modules En as electric power sources, rectifying circuits BRn for rectifying the AC voltages, control terminals An interconnecting respective outputs of the AC generating circuits PLn and respective inputs of the rectifying circuits BRn, the AC voltages being applied respectively to the control terminals BRn, switching elements SWn for selectively connecting and disconnecting at least the positive terminals Pn or the negative terminals Nn and respective output terminals of the rectifying circuits BRn, capacitors Cn interconnecting the control terminals An of adjacent ones of the circuit blocks MODn, a cutoff switch 30 interposed between at least one pair of adjacent ones E2, E3 of the battery modules, and a transformer 32 interposed between the control terminals A2, A3, which correspond to adjacent ones E2, E3 of the battery modules.

According to Inventive Example 1, when the cutoff switch 30, which is interposed between at least one pair of adjacent battery modules E2, E3, is opened, high voltage is prevented from being applied to the capacitors C2a, C2b due to a galvanically isolating action of the transformer 32, which is interposed between the control terminals A2, A3 corresponding to adjacent ones of the battery modules E2, E3. Therefore, even though the charging and discharging device 24A has the cutoff switch 30, there is no need for high withstand voltage capacitors to be used.

[Modification A of Inventive Example 1]

Figure 10:
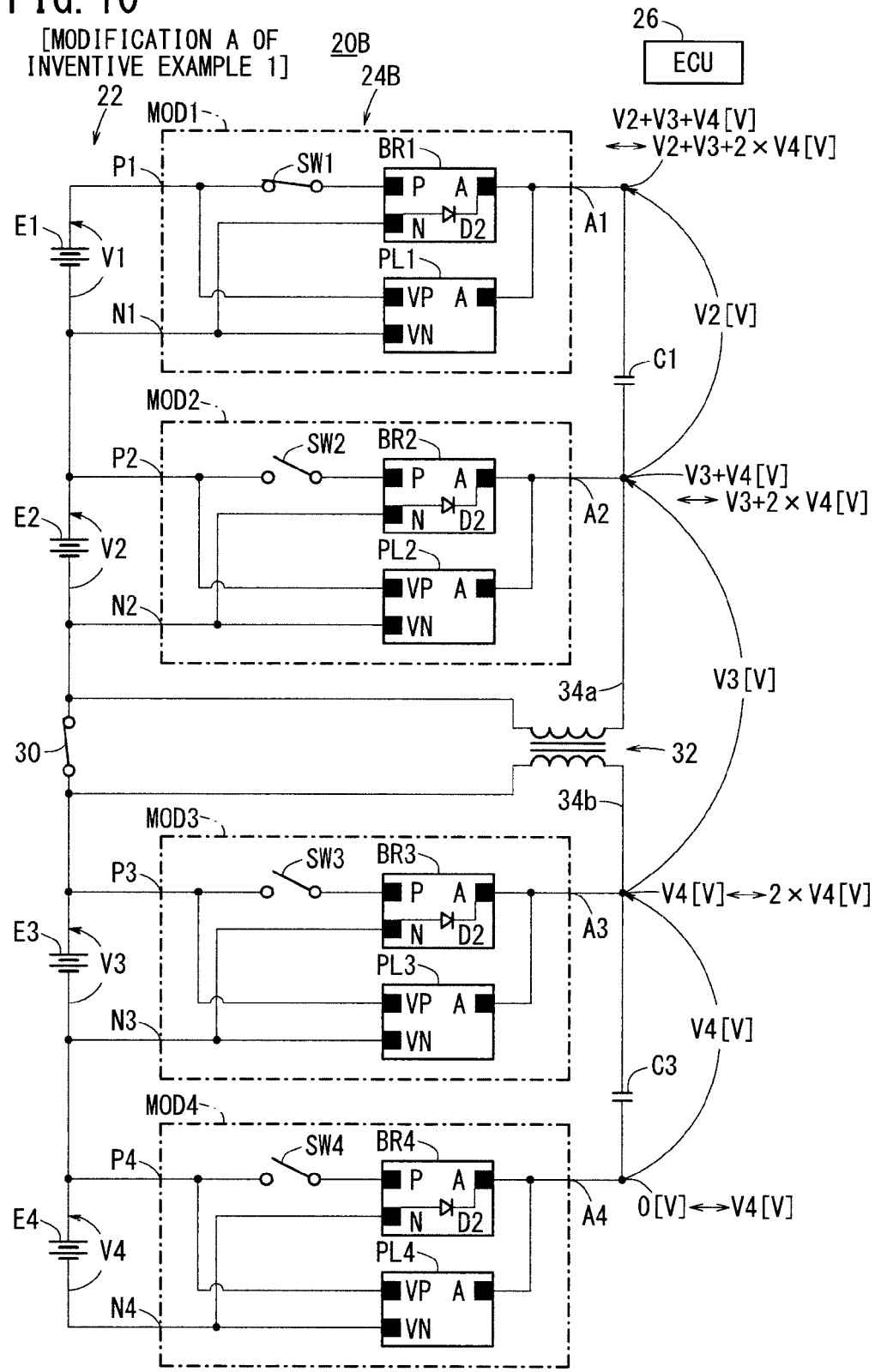
FIG. 10 is a circuit diagram showing an arrangement and operations of a charging and discharging system, which incorporates a charging and discharging device according to Modification A of Inventive Example 1.

FIG. 10 is a circuit diagram showing an arrangement and operations of a charging and discharging system 20B incorporating a charging and discharging device 24B according to Modification A of Inventive Example 1.

As shown in FIG. 3, each of the AC generating circuits PLn includes the inductor L1, which is disposed between the AC output terminal A of the AC generating circuit PLn and the junction between the cathode terminal of the diode D3 and the anode terminal of the diode D4. If the impedance of the inductor L1 is selected to be higher than the impedances of the capacitors C2a, C2b at the oscillating frequency of the rectangular-wave power supply EP, i.e., if the impedances of the capacitors C2a, C2b are designed to be negligibly smaller than the output impedance of the AC generating circuit PLn, then as shown in FIG. 10, in Modification A of Inventive Example 1, the capacitors C2a, C2b are equivalent to being short-circuited at the oscillating frequency (as illustrated in FIG. 10, the capacitors C2a, C2b are replaced by short-circuiting lines 34a, 34b).

One example of the operation of Modification A of Inventive Example 1 will be described below. As illustrated in FIG. 10, when the AC generating circuit PL4 is operated while the cutoff switch 30 and the switching element SW1 are closed, as described above with reference to FIGS. 4 and 5, a repetitive square wave, which changes between 0 [V] and V4 [V], is generated at the control terminal A4, a repetitive square wave, which changes between V4 [V] and 2×V4 [V], is generated at the control terminal A3, a repetitive square wave, which changes between V3+V4 [V] and V3+2×V4 [V], is generated at the control terminal A2, and a repetitive square wave, which changes between V2+V3+V4 [V] and V2+V3+2×V4 [V], is generated at the control terminal A1. Consequently, the battery module E4 is discharged, whereas the battery module E1 is charged.

According to Modification A of Inventive Example 1, since AC electric power can be transmitted through the transformer 32, the capacitors C2a, C2b (see FIG. 9) that were connected to the transformer 32 are dispensed with.

[Modification B of Inventive Example 1]

Figure 11:
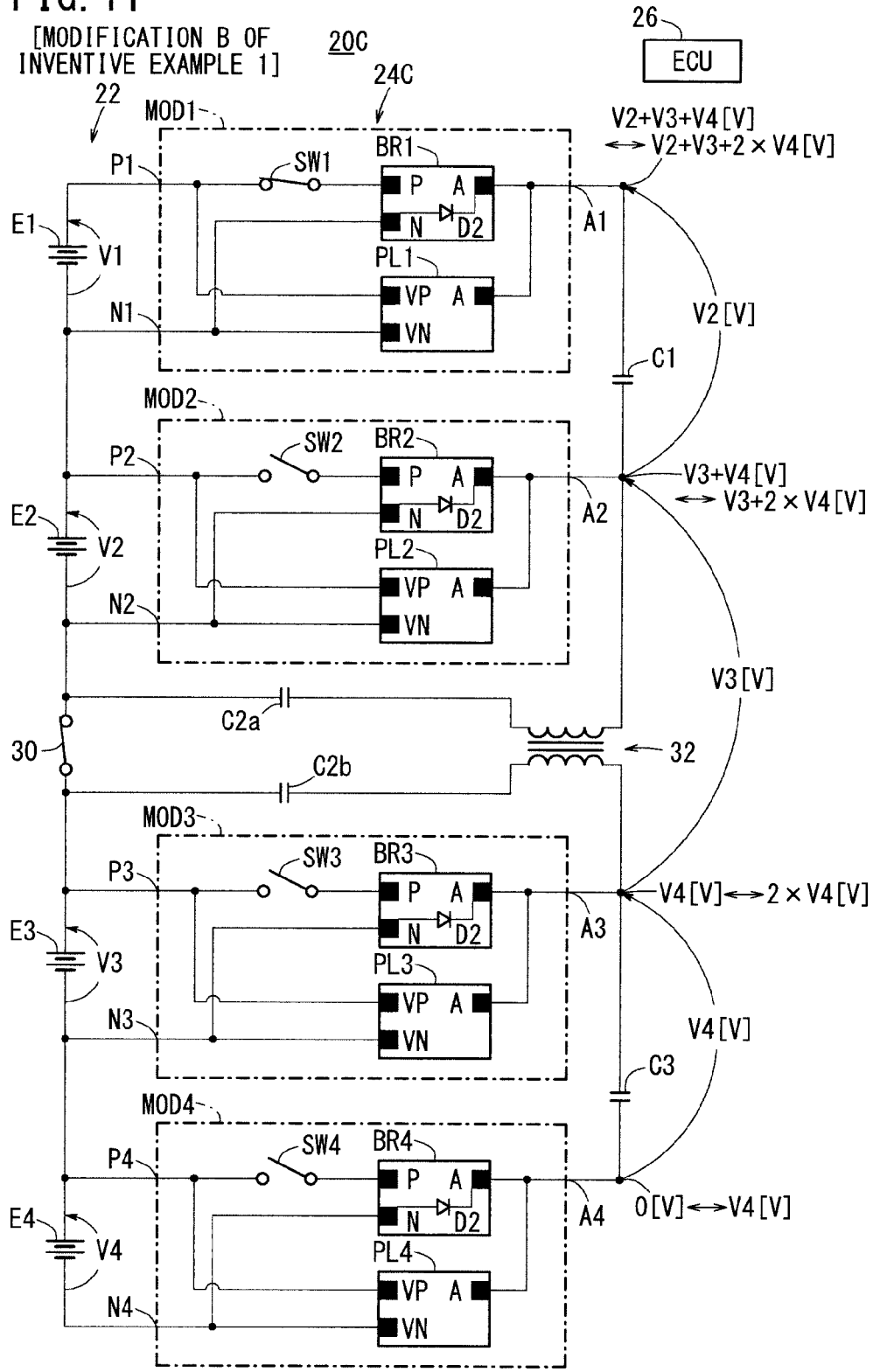
FIG. 11 is a circuit diagram showing an arrangement and operations of a charging and discharging system, which incorporates a charging and discharging device according to Modification B of Inventive Example 1.

FIG. 11 is a circuit diagram showing an arrangement and operations of a charging and discharging system 20C incorporating a charging and discharging device 24C according to Modification B of Inventive Example 1.

The capacitors C2a, C2b are not inserted in a so-called hot side (where the potential varies), but rather, are inserted in a reference potential (AC-grounded) side as a so-called cold side (where the potential does not vary).

The transformer 32 preferably has a primary inductance and a secondary inductance, which are selected to make the impedance sufficiently large with respect to the oscillating frequency of the AC generating circuits PLn and the capacitors C2a, C2b.

The advantages of Modification B of Inventive Example 1 are the same as the advantages of Modification A shown in FIG. 10, as can be understood from FIG. 11, which shows changing AC voltages at the control terminals A1 through A4. Accordingly, such features will not be described in detail below.

[Modification C and Modification D of Inventive Example 1]

Figure 12:
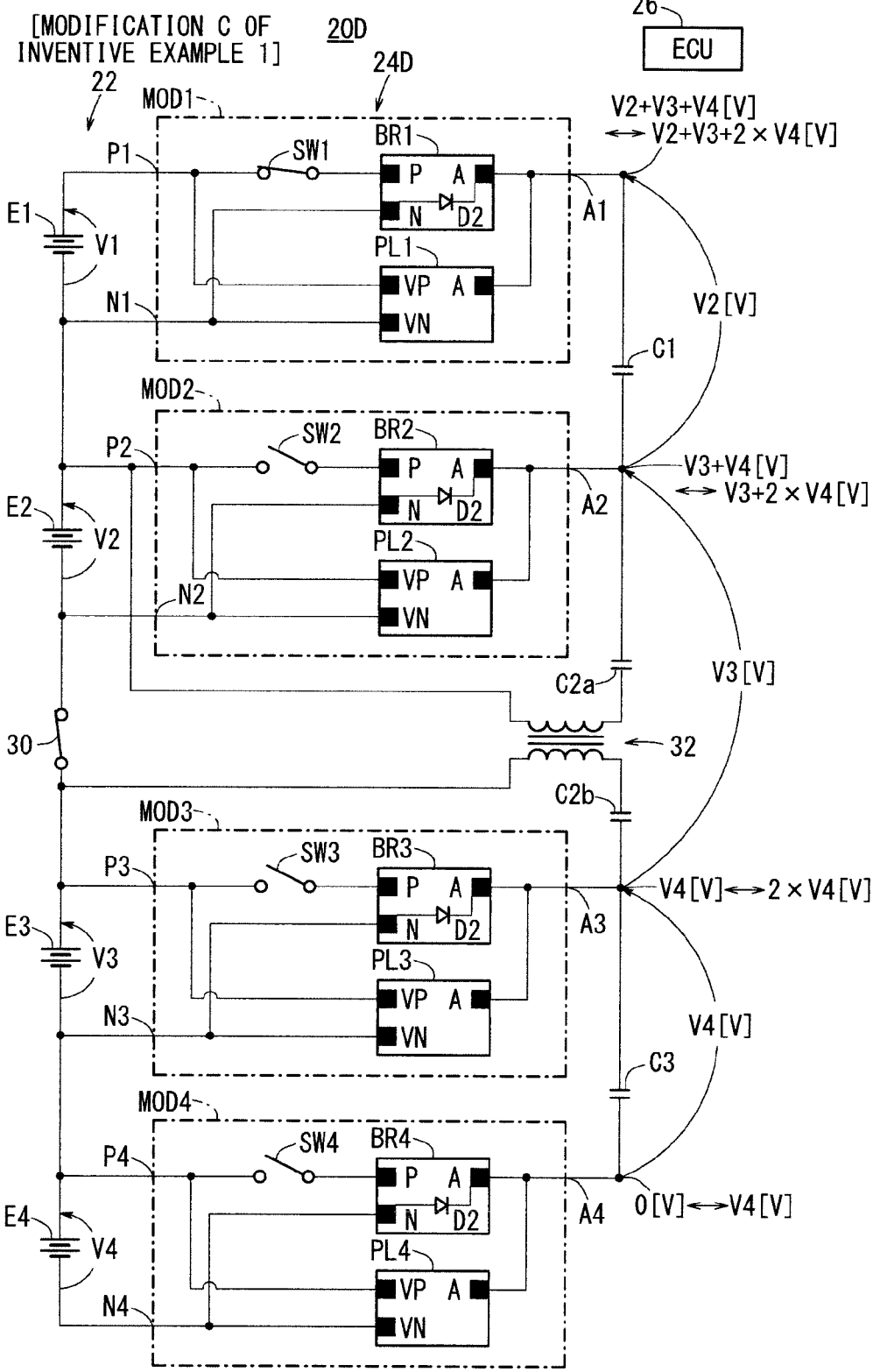
FIG. 12 is a circuit diagram showing an arrangement and operations of a charging and discharging system, which incorporates a charging and discharging device according to Modification C of Inventive Example 1.

FIG. 12 is a circuit diagram showing an arrangement and operations of a charging and discharging system 20D incorporating a charging and discharging device 24D according to Modification C of Inventive Example 1.

Figure 13:
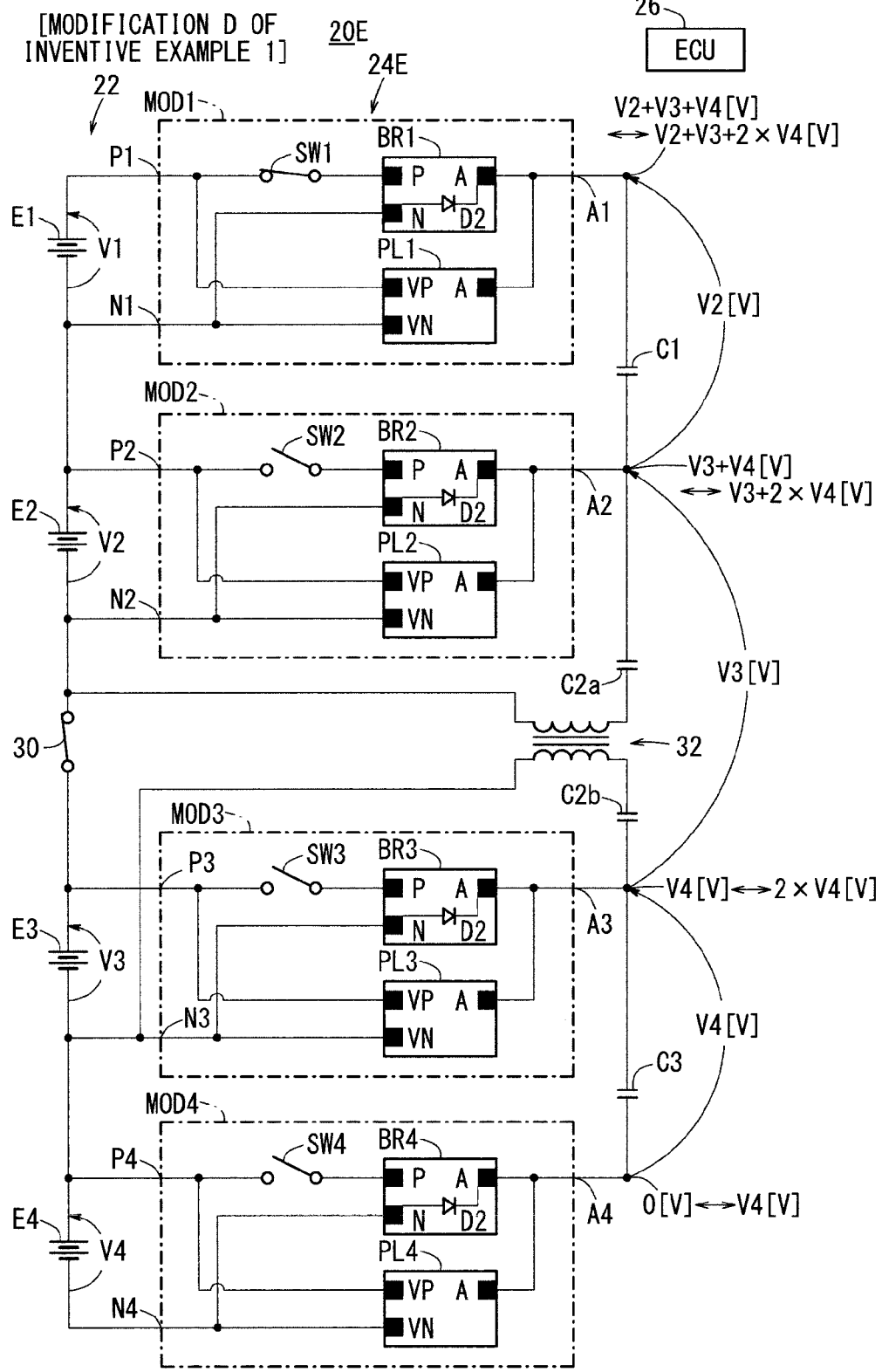
FIG. 13 is a circuit diagram showing an arrangement and operations of a charging and discharging system, which incorporates a charging and discharging device according to Modification D of Inventive Example 1.

FIG. 13 is a circuit diagram showing an arrangement and operations of a charging and discharging system 20E incorporating a charging and discharging device 24E according to Modification D of Inventive Example 1.

Compared with the charging and discharging device 24A according to Inventive Example 1 shown in FIGS. 7 and 9, the transformer 32 may have a reference potential side at a circuit point, which provides a reference potential (AC ground) for a repetitive square wave representing the output signal of the AC generating circuit PLn. Therefore, the reference potential side is not limited to both ends of the cutoff switch 30. For example, although the advantages of the circuit remain the same, the reference point side of the primary coil of the transformer 32 may be connected to the positive terminal P2 of the battery module E2 (FIG. 12), or the reference point side of the secondary coil of the transformer 32 may be connected to the negative terminal N2 of the battery module E3 (FIG. 13).

[3. Description of Arrangement and Operations of Comparative Example 2]

Figure 14:
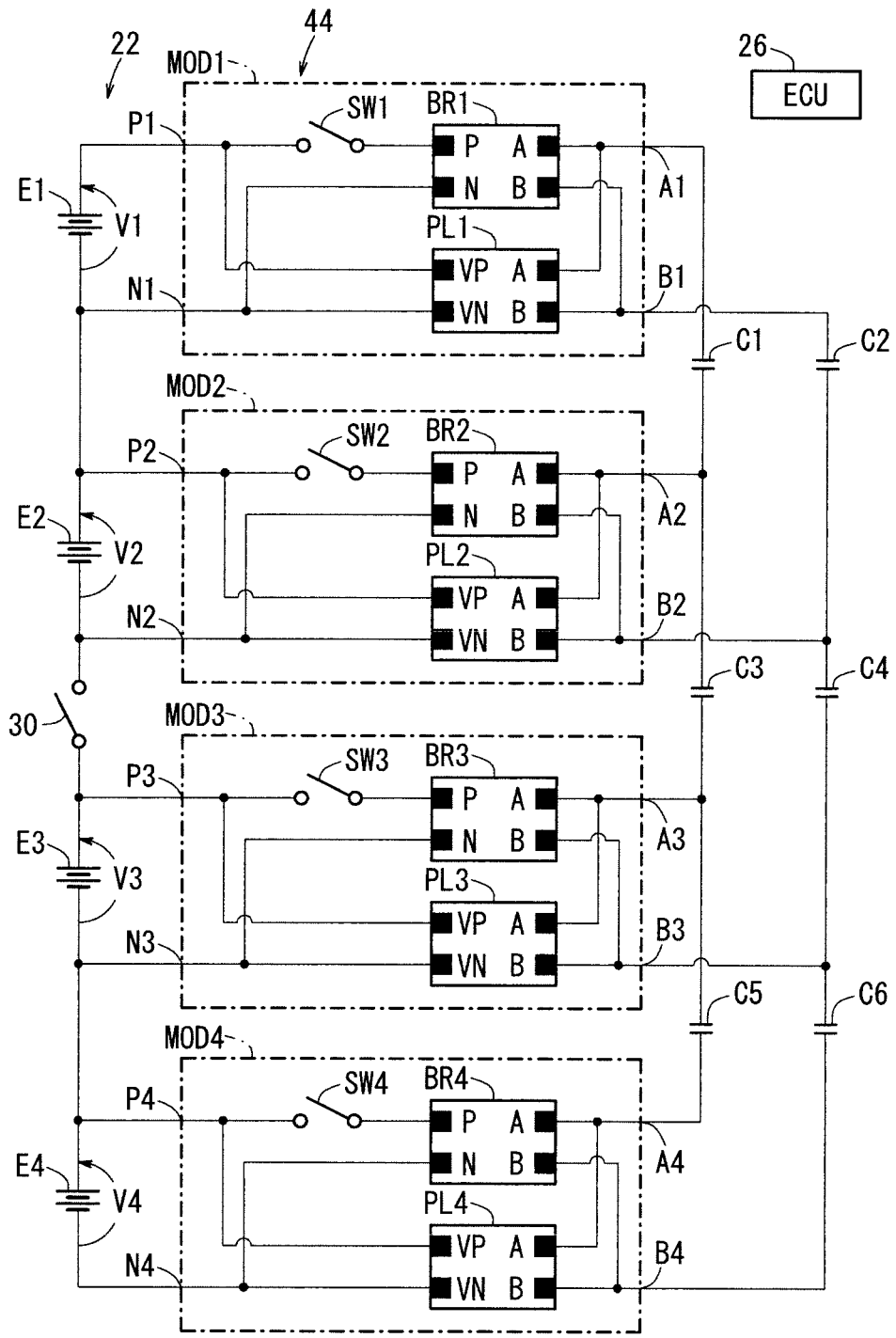
FIG. 14 is a circuit diagram showing an arrangement according to Comparative Example 2.

FIG. 14 is a circuit diagram showing an arrangement according to Comparative Example 2.

According to Comparative Example 1 shown in FIG. 1, as described above, the series-connected capacitors C1, C2, C3 are arranged in one array. On the other hand, according to Comparative Example 2, the series-connected capacitors are arranged in two arrays. The series-connected capacitors may also be arranged in three or more arrays.

FIG. 14 is a circuit diagram of a charging and discharging system 40, which has a charging and discharging device 44 with two arrays of series-connected capacitors, including an array of three series-connected capacitors C1, C2, C3, and another array of three series-connected capacitors C4, C5, C6.

Figure 15:
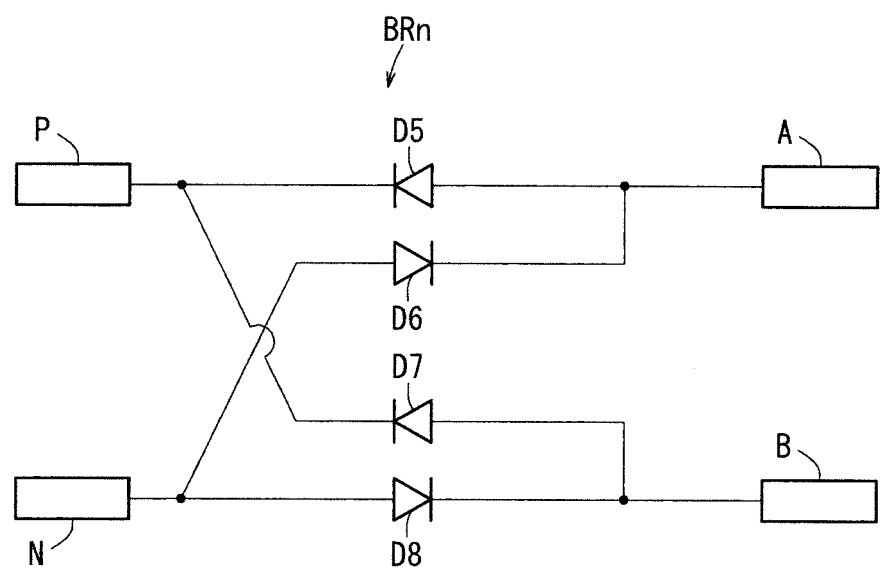
FIG. 15 is a circuit diagram of a rectifying circuit according to Comparative Example 2 and Inventive Examples 2 and 3.

FIG. 15 is a circuit diagram of each of the rectifying circuits BRn used in the charging and discharging system 40.

Figure 16:
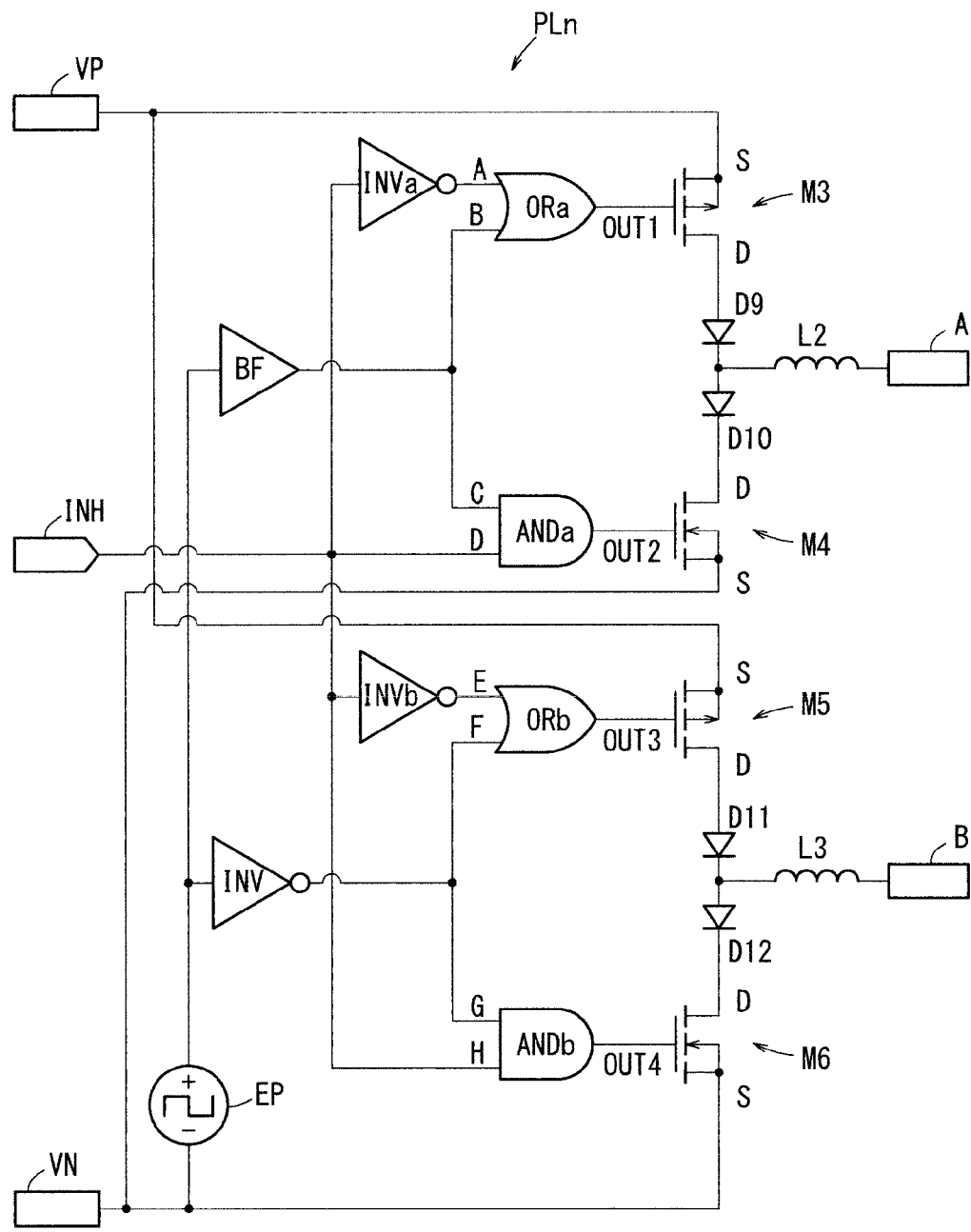
FIG. 16 is a circuit diagram of an AC generating circuit according to Comparative Example 2 and Inventive Examples 2 and 3.

FIG. 16 is a circuit diagram of each of the AC generating circuits PLn used in the charging and discharging system 40.

As shown in FIG. 14, the charging and discharging system 40 includes a battery assembly 22, which is made up of series-connected battery modules E1 through E4 with a centrally connected cutoff switch 30, and a charging and discharging device 44. The charging and discharging device includes circuit blocks (also referred to as "control modules") MOD1, MOD2, MOD3, MOD4 (also referred to representatively as "circuit blocks MODn"), capacitors C1, C3, C5, capacitors C2, C4, C6, and an ECU, which serves as a controller for controlling various parts of the charging and discharging device 44.

The circuit blocks MOD1, MOD2, MOD3, MOD4 have respective switching elements SW1, SW2, SW3, SW4 (also referred to representatively as "SWn"), respective rectifying circuits BR1, BR2, BR3, BR4 (also referred to representatively as "BRn"), and respective AC generating circuits PL1, PL2, PL3, PL4 (also referred to representatively as "PLn").

As shown in FIG. 15, each of the rectifying circuits BRn has a positive terminal P, a negative terminal N, and two AC input terminals A, B. Each of the rectifying circuits BRn serves to rectify an AC voltage.

As shown in FIG. 16, each of the AC generating circuits PLn has a positive input terminal VP, a negative input terminal VN, and two AC output terminals A, B. Using the voltage of the battery module En, each of the AC generating circuits PLn generates rectangular-wave voltages in two phases (opposite phases) (an AC voltage and another AC voltage in opposite phase, i.e., which is inverted in phase with respect to the first-mentioned AC voltage).

The positive terminals P and the negative terminals N of the rectifying circuits BRn, and the input sides of the positive input terminals VP and the negative input terminals VN of the AC generating circuits PLn are the same as in Comparative Example 1 (FIG. 1). The AC input terminals A, B of the rectifying circuits BRn, and the output sides of the AC output terminals A, B of the AC generating circuits PLn will be described in detail below.

As shown in FIG. 14, in the circuit block MOD1, the AC input terminal A of the rectifying circuit BR1 and the AC output terminal A of the AC generating circuit PL1 are connected to the control terminal A1, whereas the AC input terminal B of the rectifying circuit BR1 and the AC output terminal B of the AC generating circuit PL1 are connected to the control terminal B1 (another control terminal).

The circuit blocks MOD2, MOD4 also have the same connections. Similarly, in the circuit block MOD4, the AC input terminal A of the rectifying circuit BR4 and the AC output terminal A of the AC generating circuit PL4 are connected to the control terminal A4, whereas the AC input terminal B of the rectifying circuit BR4 and the AC output terminal B of the AC generating circuit PL4 are connected to the control terminal B4 (another control terminal).

As shown in FIG. 14, similar to the case of Comparative Example 1 (see FIG. 1), the capacitor C1 is connected between the control terminal A1 and the control terminal A2, the capacitor C3 is connected between the control terminal A2 and the control terminal A3, and the capacitor C5 is connected between the control terminal A3 and the control terminal A4.

However, Comparative Example 2 differs from Comparative Example 1, in that, as shown in FIG. 14, the capacitor C2 is connected between the control terminal B1 and the control terminal B2 (another control terminal), the capacitor C4 is connected between the control terminal B2 and the control terminal B3 (another control terminal), and the capacitor C6 is connected between the control terminal B3 and the control terminal B4.

As described above, FIG. 15 is a detailed circuit diagram of each of the rectifying circuits BRn according to Comparative Example 2 shown in FIG. 14. Each of the rectifying circuits BRn includes four diodes D5, D6, D7, D8. The diodes D5, D7 have respective cathode terminals, which are connected to the positive terminal P, and the diodes D6, D8 have respective anode terminals, which are connected to the negative terminal N. An anode terminal of the diode D5 and a cathode terminal of the diode D6 are connected to the AC input terminal A, and an anode terminal of the diode D7 and a cathode terminal of the diode D8 are connected to the AC input terminal B. The rectifying circuit BRn full-wave-rectifies the AC input voltages applied to the AC input terminals A, B, and supplies the rectified voltages to the positive terminal P and to the negative terminal N. Stated otherwise, an alternating current that flows through the AC input terminal A is rectified into a direct current, which flows through the positive terminal P and the negative terminal N. In addition, an alternating current that flows through the AC input terminal B is rectified into a direct current, which flows through the positive terminal P and the negative terminal N.

As described above, FIG. 16 is a circuit diagram of each of the AC generating circuits PLn according to Comparative Example 2 shown in FIG. 14. Each of the AC generating circuits PLn has OR gates ORa, Orb, AND gates ANDa, ANDb, inverters INV, INVa, INVb, a buffer BF, p-MOS transistors M3, M5, n-MOS transistors M4, M6, diodes D9, D10, D11, D12, a rectangular-wave power supply EP, and inductors L2, L3. The inductors L2, L3 may be provided by wiring inductances.

The rectangular-wave power supply EP is connected to the inverter INV and to the buffer BF. The buffer BF has an output, which is connected to an input terminal B of the OR gate ORa and to an input terminal C of the AND gate ANDa. An inhibit terminal INH is connected to an input terminal D of the AND gate ANDa and to an input terminal of the inverter INVa, the output of which is connected to an input terminal A of the OR gate ORa.

The OR gate ORa has an output terminal OUT1, which is connected to a gate terminal of the p-MOS transistor M3, and the AND gate ANDa has an output terminal OUT2, which is connected to a gate terminal of the n-MOS transistor M4.

The p-MOS transistor M3 has a source terminal, which is connected to the positive input terminal VP, and a drain terminal, which is connected through the diodes D9, D10 to a drain terminal of the n-MOS transistor M4. The n-MOS transistor M4 has a source terminal, which is connected to the negative input terminal VN. The junction between the diodes D9, D10 is connected through the inductor L2 to the AC output terminal A.

The OR gate ORb, the AND gate ANDb, the inverter INVb, the rectangular-wave power supply EP, the p-MOS transistor M5, the n-MOS transistor M6, and the diodes D11, D12 make up a circuit, which is the same as the AC generating circuit PLn shown in FIG. 3. Accordingly, the features thereof will not be described in detail below.

The inverter INV has an output, which is connected to an input terminal F of the OR gate ORb and to an input terminal G of the AND gate ANDb. The inhibit terminal INH is connected to an input terminal H of the AND gate ANDb and to an input terminal of the inverter INVb, the output of which is connected to an input terminal E of the OR gate ORb.

The OR gate ORb has an output terminal OUT3, which is connected to the gate of the p-MOS transistor M5, and the AND gate ANDb has an output terminal OUT4, which is connected to the gate of the n-MOS transistor M6.

The p-MOS transistor M5 has a source terminal, which is connected to the positive input terminal VP, and a drain terminal, which is connected through the diodes D11, D12 to a drain terminal of the n-MOS transistor M6. The n-MOS transistor M6 has a source terminal connected to the negative input terminal VN.

The junction between the diodes D11, D12 is connected through the inductor L3 to the AC output terminal B.

The AC generating circuit PLn, which is arranged in the foregoing manner, supplies rectangular-wave voltages (repetitive rectangular-wave voltages), which are inverted in phase, to the AC output terminals A (An), B (Bn) in synchronism with the rectangular-wave power supply EP.

More specifically, the p-MOS transistor M3 and the n-MOS transistor M4 are turned on and off alternately, and the p-MOS transistor M5 and the n-MOS transistor M6 are turned on and off alternately in opposite phase, so as to supply phase-inverted rectangular-wave currents through the AC output terminals A, B.

In FIG. 14, the cutoff switch 30 is closed, and the voltage V4 of the battery module E4 is made higher than the voltage V1 of the battery module E1. Next, the switching element SW1 is turned on and the switching elements SW2, SW3, SW4 are turned off. The AC generating circuit PL4 is operated in order to supply AC voltages to the AC output terminals A, B, whereby the potentials at the control terminals A4, B4 alternate (transition) between the potential at the positive terminal P4 and the potential at the negative terminal N4 of the battery module E4.

When the potentials at the control terminals A1, B1 are alternately inverted, the battery module E1 is charged through the rectifying circuit BR1 and the switching element SW1, whereas the battery module E4 is discharged.

The control modules MOD1, MOD2, MOD3, MOD4 are operated in a similar manner when the switching elements SW1, SW2, SW3, SW4 are selected.

As described above, when the cutoff switch 30 is closed, according to Comparative Example 2, the charging and discharging device 44 discharges one of the battery modules En, the charge voltage of which is relatively high, and charges another one of the battery modules En, the charge voltage of which is relatively low.

Figure 17:
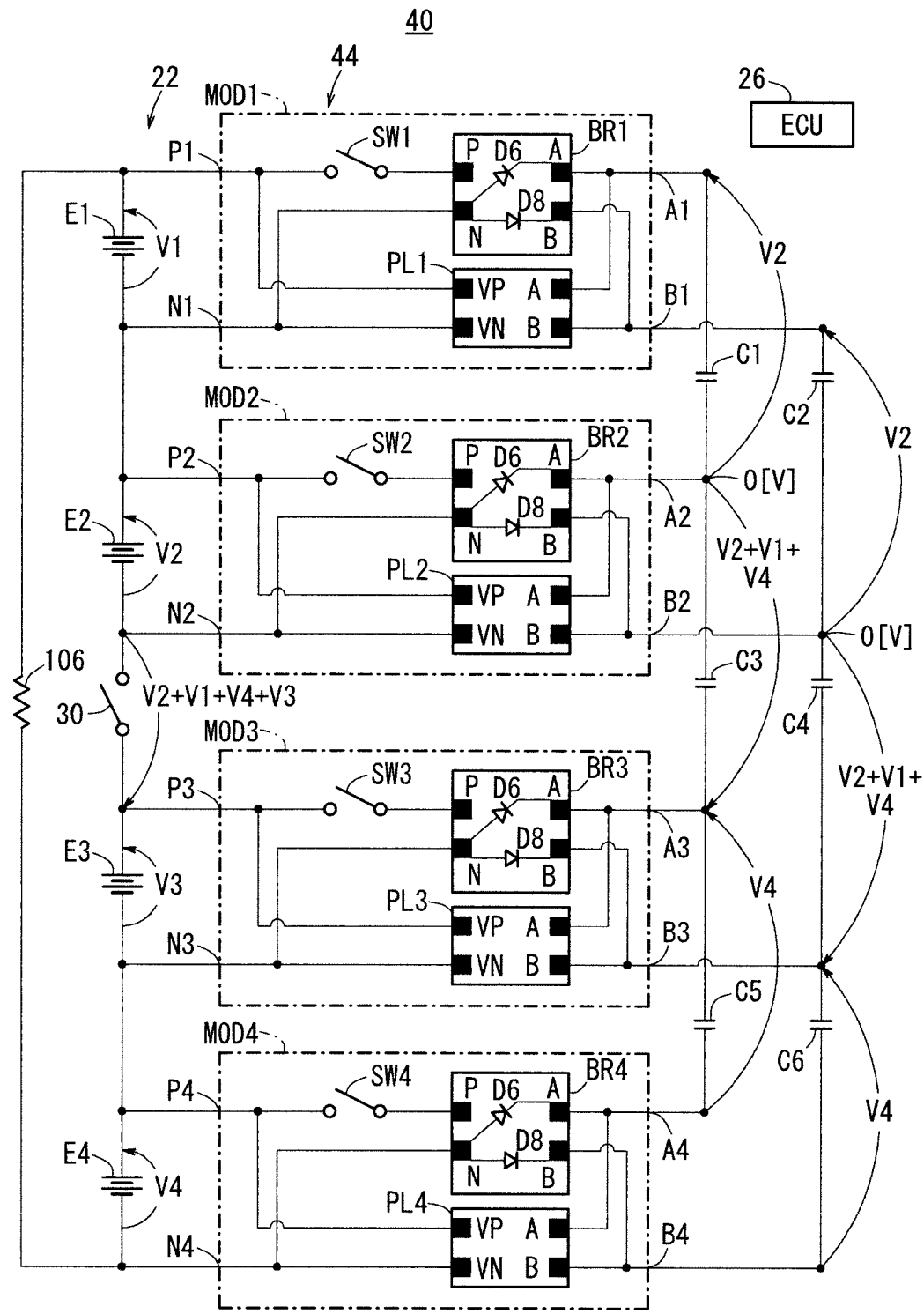
FIG. 17 is a diagram illustrating problems of Comparative Example 2.

However, the charging and discharging device 44 according to Comparative Example 2 experiences problems, as have been described above with reference to FIGS. 37 and 38. If a load 106 is connected between the maximum potential of the battery assembly 22 (in FIG. 17, the potential V1+V2+V3+V4 [V], which appears at the positive terminal of the battery module E1) and the minimum potential of the battery assembly 22 (in FIG. 17, the potential 0 [V], which appears at the negative terminal N4 of the battery module E4), then as shown in FIG. 17, when the cutoff switch 30 is opened, a reversed value of V2+V1+V4 is applied to the capacitors C3, C4. Actually, since there are several battery modules En, if the combined voltage thereof is several hundred V, then almost all of the reversed value of several hundred V is applied to the capacitors C3, C4 upon opening of the cutoff switch 30. Consequently, the capacitors C3, C4 must be high withstand voltage capacitors.

Arrangements and operations of Inventive Example and Modifications thereof, which do not require high withstand voltage capacitors as the capacitors C3, C4 even though the battery assembly 22 includes the cutoff switch 30, will be described below. Since the basic concept of Inventive Example 2 and Modifications thereof is the same as the basic concept of Inventive Example 1 and Modifications thereof, the features of Inventive Example 2 and Modifications thereof will be described only briefly below, rather than in detail.

[4. Description of Arrangement and Operations of Inventive Example 2 and Modifications]

Figure 18:
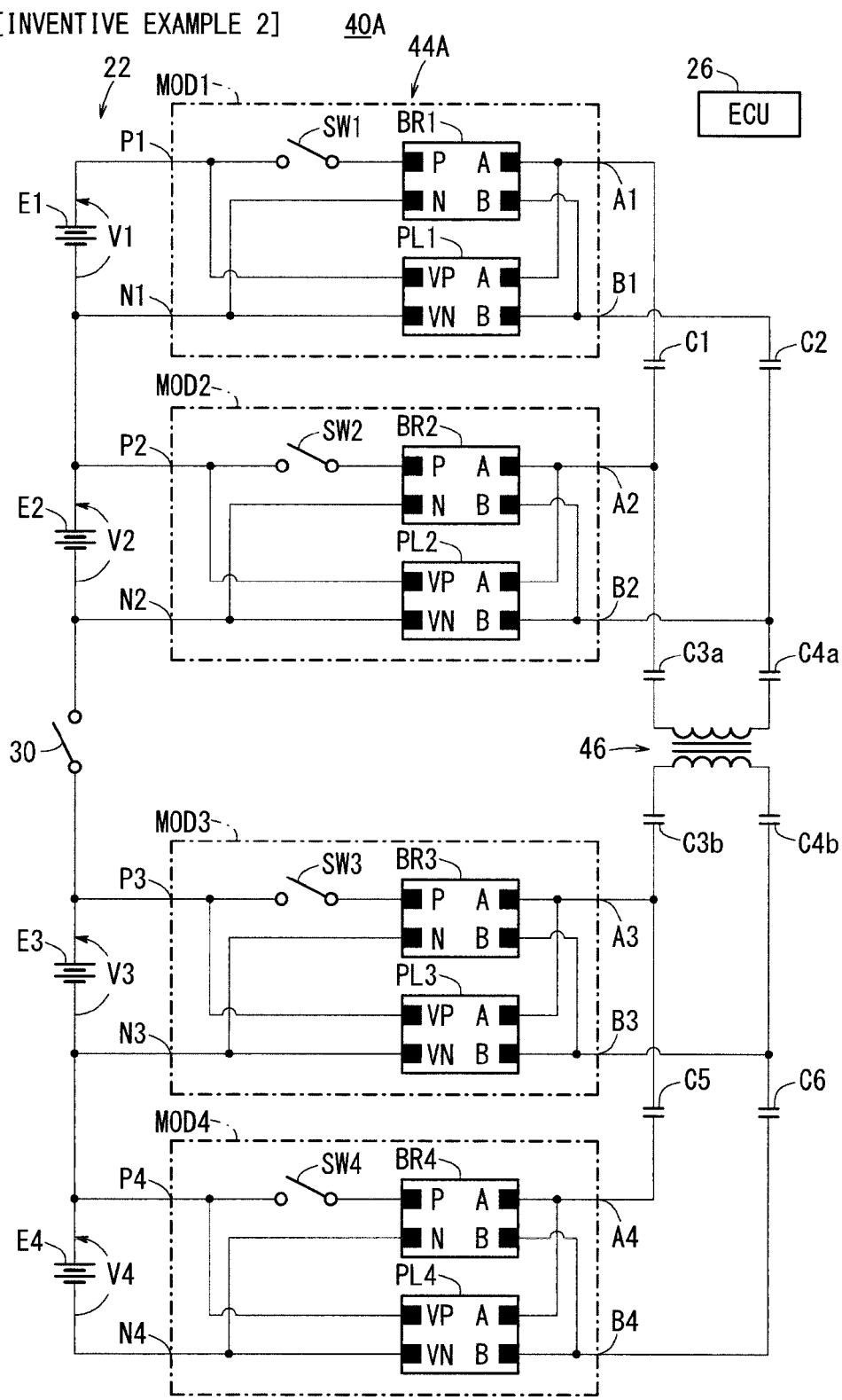
FIG. 18 is a circuit diagram of a charging and discharging device according to Inventive Example 2.

As shown in FIG. 18, a charging and discharging device 44A of a charging and discharging system 40A according to Inventive Example 2 differs from the arrangement according to Comparative Example 2, in that the capacitors C3, C4 that interconnect the circuit block MOD2 and the circuit block MOD3 are replaced with two series-connected capacitors C3a, C3b and two series-connected capacitors C4a, C4b, respectively. In addition, a transformer 46 is disposed between the pairs of capacitors.

The transformer 46 includes a primary winding having one end connected to the capacitor C3a and another end connected to the capacitor C4a. The transformer 46 also includes a secondary winding having one end connected to the capacitor C3b and another end connected to the capacitor C4b.

Figure 19:
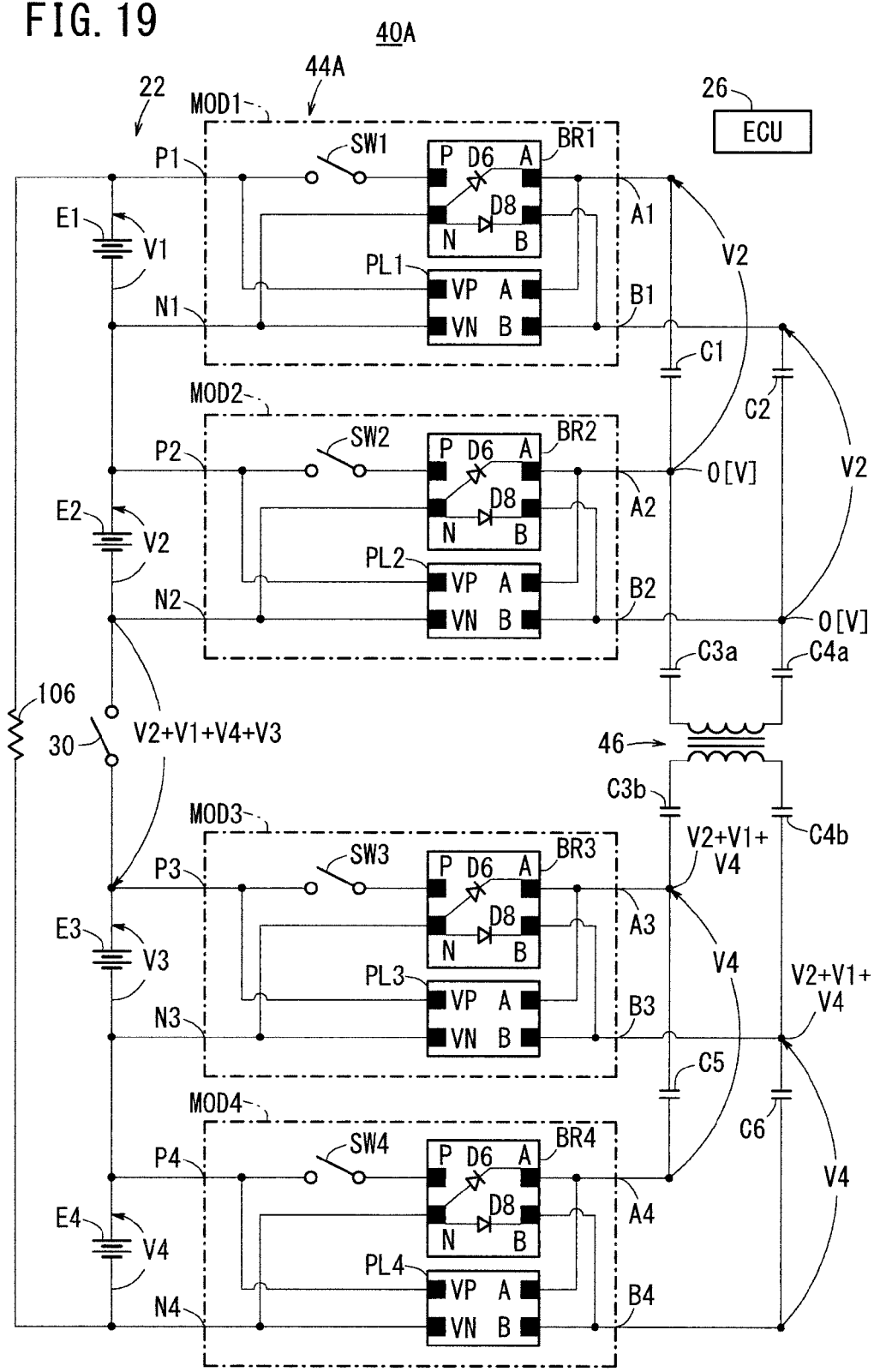
FIG. 19 is a circuit diagram of a circuit according to Inventive Example 2, which illustrates an operation process for solving problems of Comparative Example 2.

When the cutoff switch 30 is opened, a route for transmitting an alternating current is separated galvanically by the transformer 46 into a primary side and a secondary side. Therefore, as shown in FIG. 19, which illustrates applied voltages, a high voltage is not applied to the capacitors C3a, C3b, C4a, C4b.

Since the capacitors are connected in series to the respective windings of the transformer 46, a DC voltage is not applied continuously to the windings of the transformer 46, regardless of the output states of the AC generating circuits PLn.

A process of discharging one of the battery modules En while charging another one of the battery modules En is performed in the same manner as the above-described process with respect to Comparative Example 1 and Inventive Example 1, and thus this process will not be described in detail below. According to Inventive Example 2, when one battery module En is discharged while another battery module En is charged, the charging efficiency is increased and the charging time is shortened through implementation of full-wave rectification.

Similar to the case of Inventive Example 1 shown in FIG. 1, in order to allow the charging and discharging device 44A to operate bidirectionally and in a uniform manner on both of the windings of the transformer 46, the transformer 46 preferably has a winding ratio of 1:1.

The transformer 46 preferably has a primary inductance and a secondary inductance, which are selected in order to make the impedance sufficiently large with respect to the oscillating frequency of the AC generating circuits PLn.

Various modifications of the charging and discharging system 40A, which incorporates therein the charging and discharging device 44A according to Inventive Example 2 shown in FIG. 18, will be described below.

Figure 20:
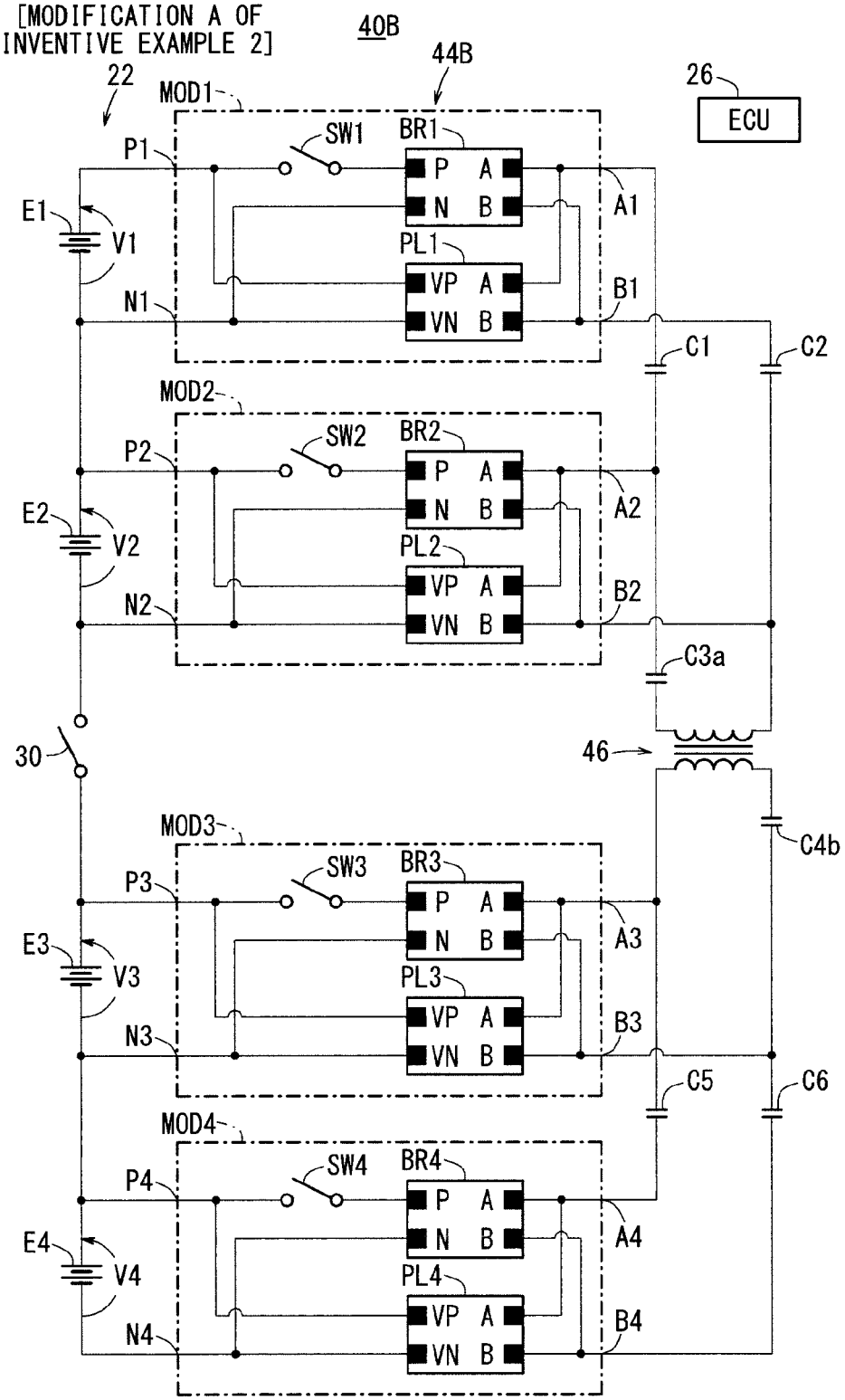
FIG. 20 is a circuit diagram of a charging and discharging system, which incorporates a charging and discharging device according to Modification A of Inventive Example 2.

FIG. 20 is a circuit diagram of a charging and discharging system 40B, which incorporates a charging and discharging device 44B according to Modification A of Inventive Example 2.

Figure 21:
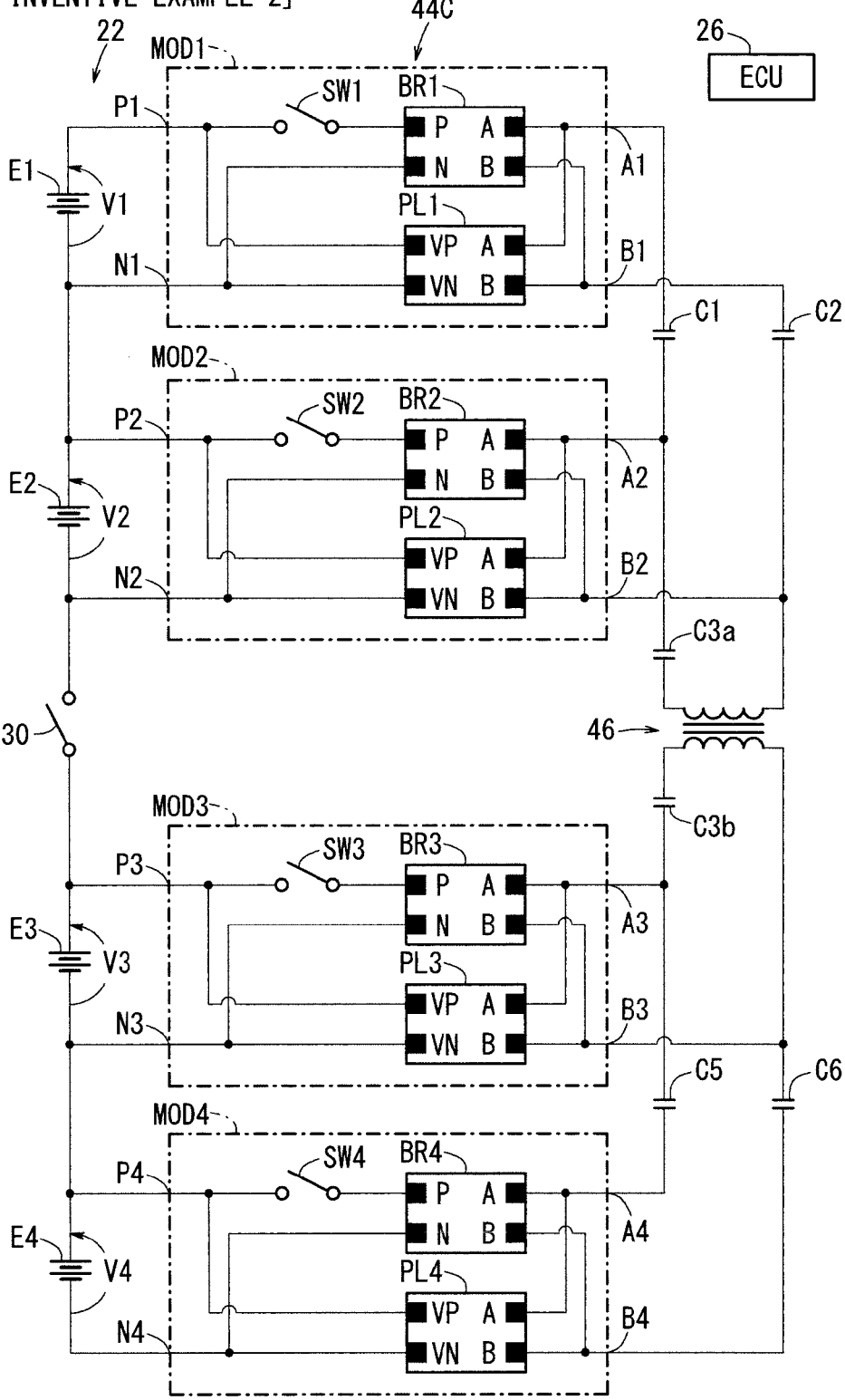
FIG. 21 is a circuit diagram of a charging and discharging system, which incorporates a charging and discharging device according to Modification B of Inventive Example 2.

FIG. 21 is a circuit diagram of a charging and discharging system 40C, which incorporates a charging and discharging device 44C according to Modification B of Inventive Example 2.

With the charging and discharging device 44A according to Inventive Example 2 shown in FIG. 18, the capacitor C3a, the primary winding of the transformer 46, and the capacitor C4a are connected in series with each other. With the charging and discharging device 44B shown in FIG. 20 and the charging and discharging device 44C shown in FIG. 21, the functions of the two capacitors C3a, C4a may be combined together, so that either one of the capacitor C3a or the capacitor C4a may be dispensed with. Similarly, either one of the capacitor C3b or the capacitor C4b, which are connected to the secondary side, may be dispensed with.

[5. Description of Arrangement and Operations of Comparative Example 3]

Figure 22:
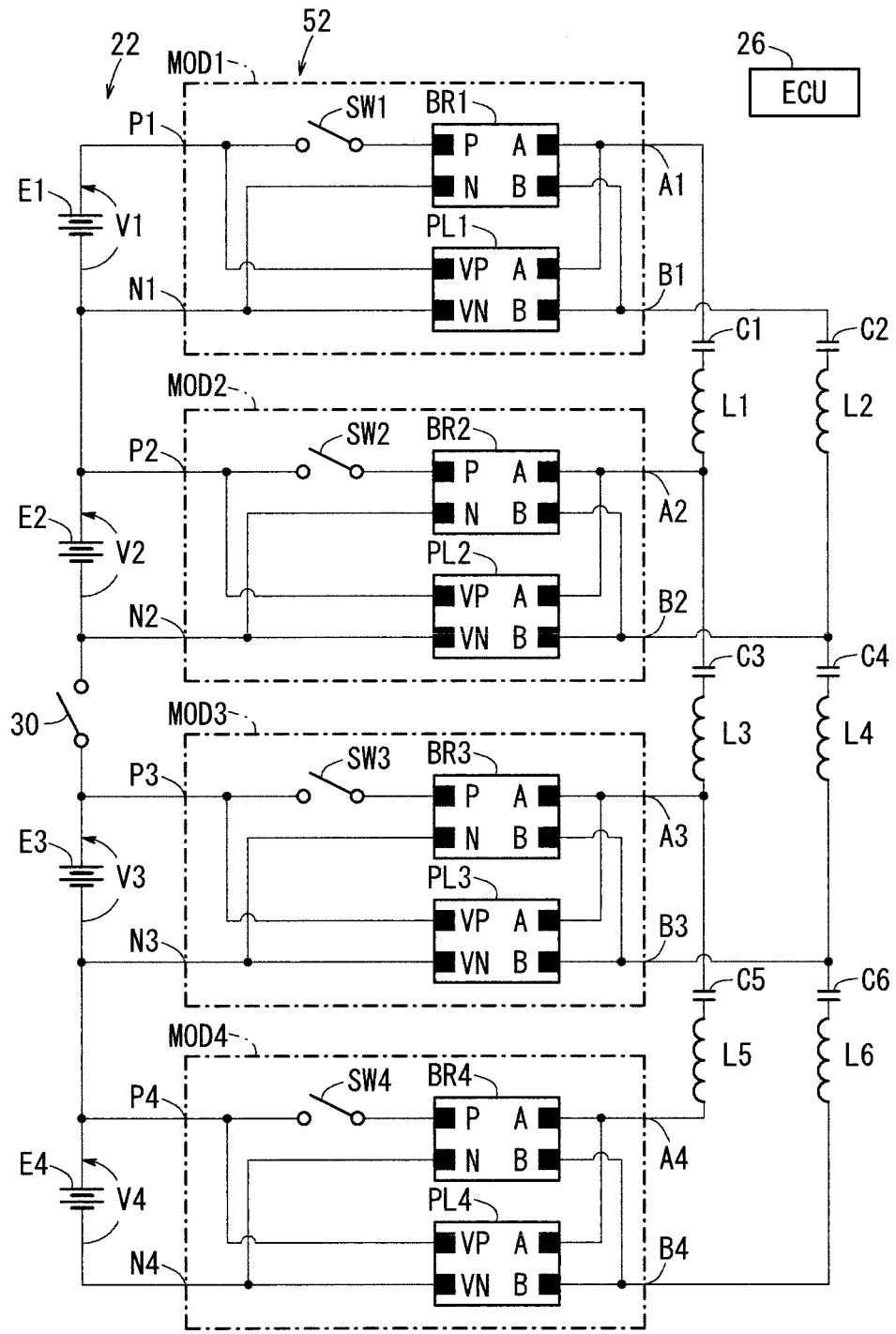
FIG. 22 is a circuit diagram showing an arrangement according to Comparative Example 3.

FIG. 22 is a circuit diagram showing an arrangement of a charging and discharging system 50, which incorporates a charging and discharging device 52 according to Comparative Example 3.

Figure 23:
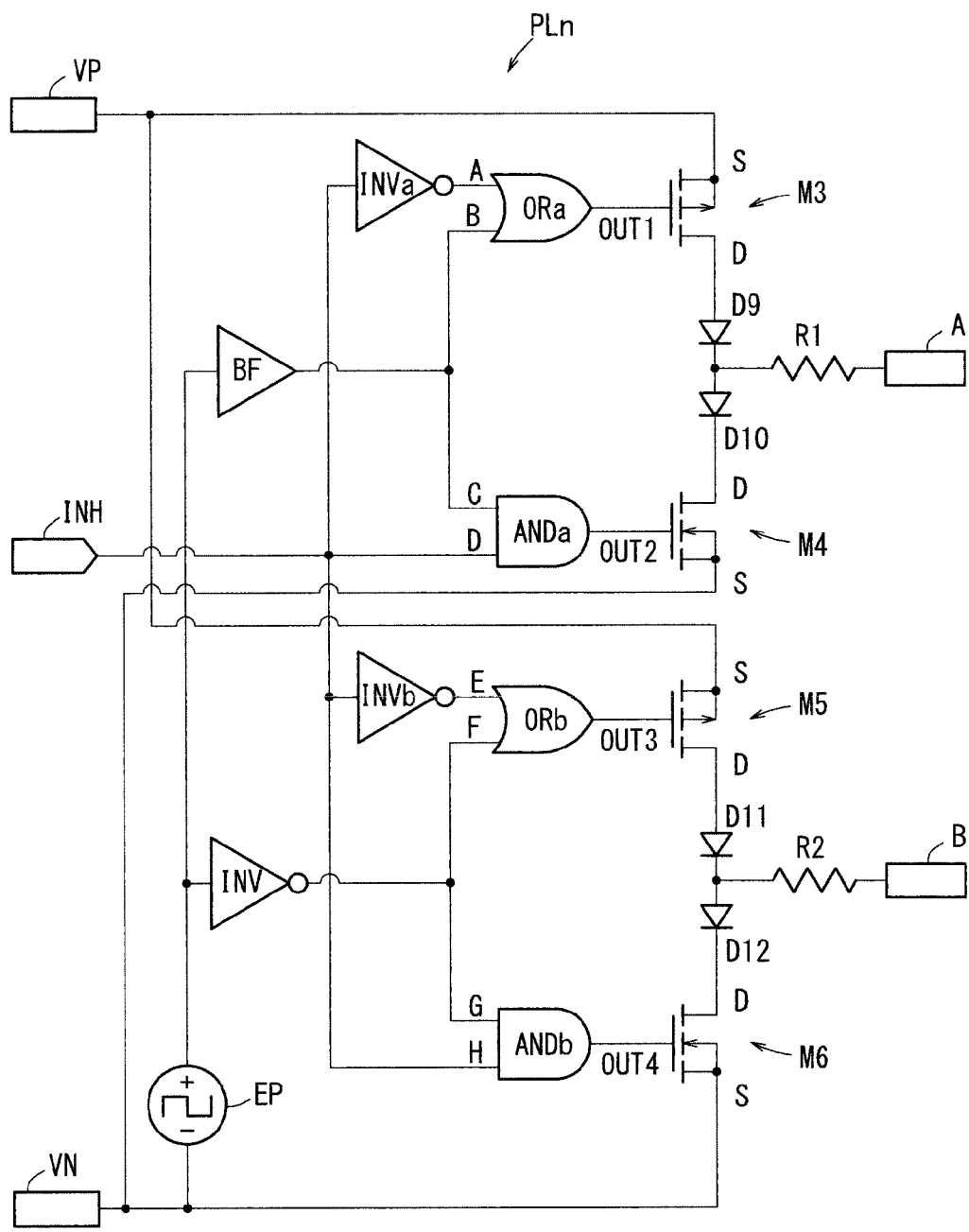
FIG. 23 is a circuit diagram of an AC generating circuit according to Comparative Example 3 and Inventive Example 3.

FIG. 23 is a circuit diagram of AC generating circuits PL1, PL2, PL3, PL4 (also referred to representatively as "PLn") of the charging and discharging device 52 shown in FIG. 22.

With the charging and discharging device 52 according to Comparative Example 3, the series-connected circuit, which is made up of capacitors C1, C3, C5 of the charging and discharging device 44 according to Comparative Example 2 shown in FIG. 14, is replaced with a series-connected circuit made up of a capacitor C1 and an inductor L1, a series-connected circuit made up of a capacitor C3 and an inductor L3, and a series-connected circuit made up of a capacitor C5 and an inductor L5, in the charging and discharging device 52 shown in FIG. 22. In addition, the series-connected circuit, which is made up of capacitors C2, C4, C6 of the charging and discharging device 44 according to Comparative Example 2 shown in FIG. 14, is replaced with a series-connected circuit made up of a capacitor C2 and an inductor L2, a series-connected circuit made up of a capacitor C4 and an inductor L4, and a series-connected circuit made up of a capacitor C6 and an inductor L6, in the charging and discharging device 52 shown in FIG. 22.

With each of the AC generating circuits PLn, as shown in FIG. 23, in the charging and discharging device 52 shown in FIG. 22, the inductors L2, L3 at the output stage of each of the AC generating circuits PLn of the charging and discharging device 44 according to Comparative Example 2 shown in FIG. 16 are replaced with resistors R1, R2.

The circuit arrangement, which is configured in the foregoing manner, makes it possible for charging currents of the respective control modules MODn to be uniform. The arrangement and operations of the charging and discharging system 50 will be described below.

With the charging and discharging device 52 shown in FIG. 22, the series-connected circuit, which is made up of the capacitor C1 and the inductor L1, is connected between the control terminal A1 and the control terminal A2, the series-connected circuit, which is made up of the capacitor C2 and the inductor L2, is connected between the control terminal B1 and the control terminal B2, the series-connected circuit, which is made up of the capacitor C3 and the inductor L3, is connected between the control terminal A2 and the control terminal A3, the series-connected circuit, which is made up of the capacitor C4 and the inductor L4, is connected between the control terminal B2 and the control terminal B3, the series-connected circuit, which is made up of the capacitor C5 and the inductor L5, is connected between the control terminal A3 and the control terminal A4, and the series-connected circuit, which is made up of the capacitor C6 and the inductor L6, is connected between the control terminal B3 and the control terminal B4, thereby making up several AC electric paths.

A process of charging the battery module E1 in the uppermost stage from the AC generating circuit PL4 connected to the control module MOD4 for the battery module E4 in the lowermost stage, a process of charging the battery module E2 in the second stage from the AC generating circuit PL4 connected to the control module MOD4 for the battery module E4 in the lowermost stage, and a process of charging the battery module E3 in the third stage from the AC generating circuit PL4 connected to the control module MOD4 for the battery module E4 in the lowermost stage will be described in detail below, in relation to the charging and discharging device 52 according to Comparative Example 3 shown in FIG. 22.

Figure 24:
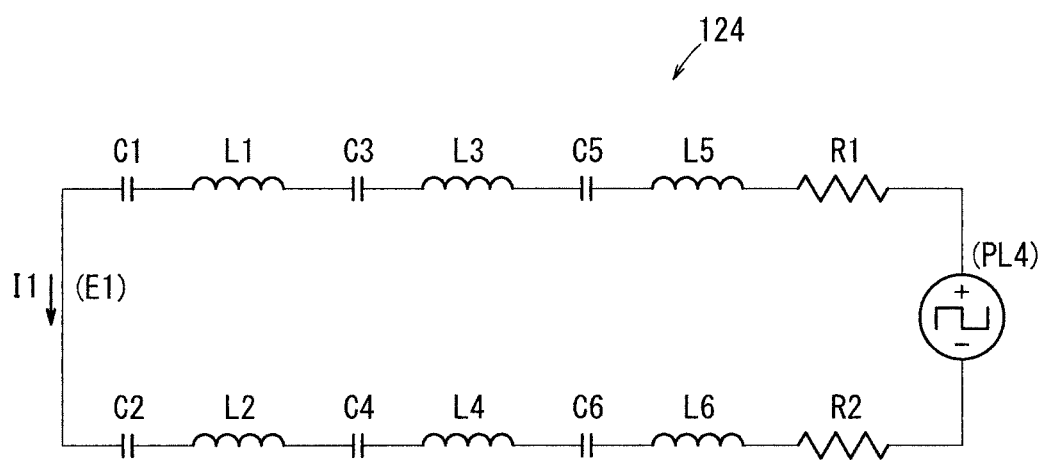
FIG. 24 is an equivalent circuit diagram (AC equivalent circuit diagram) of a charging and discharging device according to Comparative Example 3, which takes into account only an AC component at the time that a battery module charges another battery module.
Figure 25:
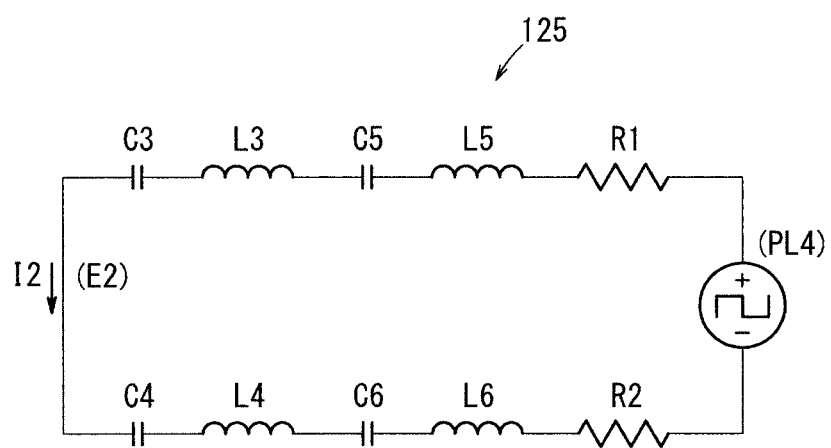
FIG. 25 is an equivalent circuit diagram (AC equivalent circuit diagram) of the charging and discharging device according to Comparative Example 3, which takes into account only an AC component at the time that a battery module charges another battery module.
Figure 26:
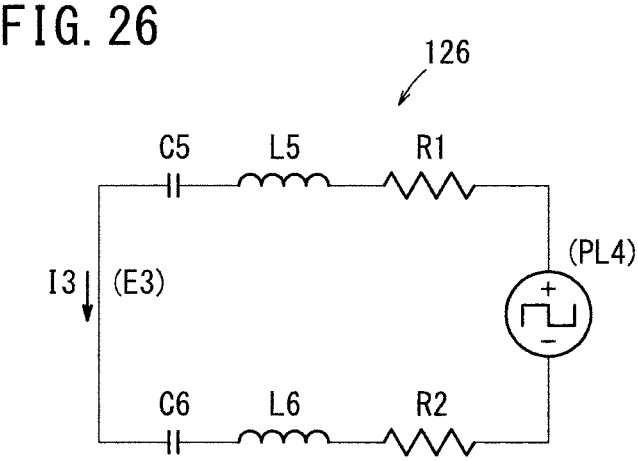
FIG. 26 is an equivalent circuit diagram (AC equivalent circuit diagram) of the charging and discharging device according to Comparative Example 3, which takes into account only an AC component at the time that a battery module charges another battery module.

FIG. 24 shows an equivalent circuit (AC equivalent circuit) 124 of the charging and discharging device 52 according to Comparative Example 3 shown in FIG. 22, which takes into account only an AC component at the time that the battery module E4 charges the battery module E1. FIG. 25 shows an equivalent circuit (AC equivalent circuit) 125 of the charging and discharging device 52 according to Comparative Example 3 shown in FIG. 22, which takes into account only an AC component at the time that the battery module E4 charges the battery module E2. FIG. 26 shows an equivalent circuit (AC equivalent circuit) 124 of the charging and discharging device 52 according to Comparative Example 3 shown in FIG. 22, which takes into account only an AC component at the time that the battery module E4 charges the battery module E3.

The equivalent circuit 124 shown in FIG. 24 corresponds to a mode of operation of the charging and discharging device 52 in which, from among the switching elements SW1 through SW4 of the circuit blocks MOD1 through MOD4 of the charging and discharging device 52, only the switching element SW1 of the circuit block MOD1 is turned on, and further, from among the AC generating circuits PL1 through PL4 of the circuit blocks MOD1 through MOD4 of the charging and discharging device 52, only the AC generating circuit PL4 is operated to generate an AC voltage. The equivalent circuit 125 shown in FIG. 25 corresponds to a mode of operation of the charging and discharging device 52 in which, from among the switching elements SW1 through SW4 of the circuit blocks MOD1 through MOD4 of the charging and discharging device 52, only the switching element SW2 of the circuit block MOD2 is turned on, and further, from among the AC generating circuits PL1 through PL4 of the circuit blocks MOD1 through MOD4 of the charging and discharging device 52, only the AC generating circuit PL4 is operated to generate an AC voltage. The equivalent circuit 126 shown in FIG. 26 corresponds to a mode of operation of the charging and discharging device 52 in which, from among the switching elements SW1 through SW4 of the circuit blocks MOD1 through MOD4 of the charging and discharging device 52, only the switching element SW3 of the circuit block MOD3 is turned on, and further, from among the AC generating circuits PL1 through PL4 of the circuit blocks MOD1 through MOD4 of the charging and discharging device 52, only the AC generating circuit PL4 is operated to generate an AC voltage.

Figure 27:
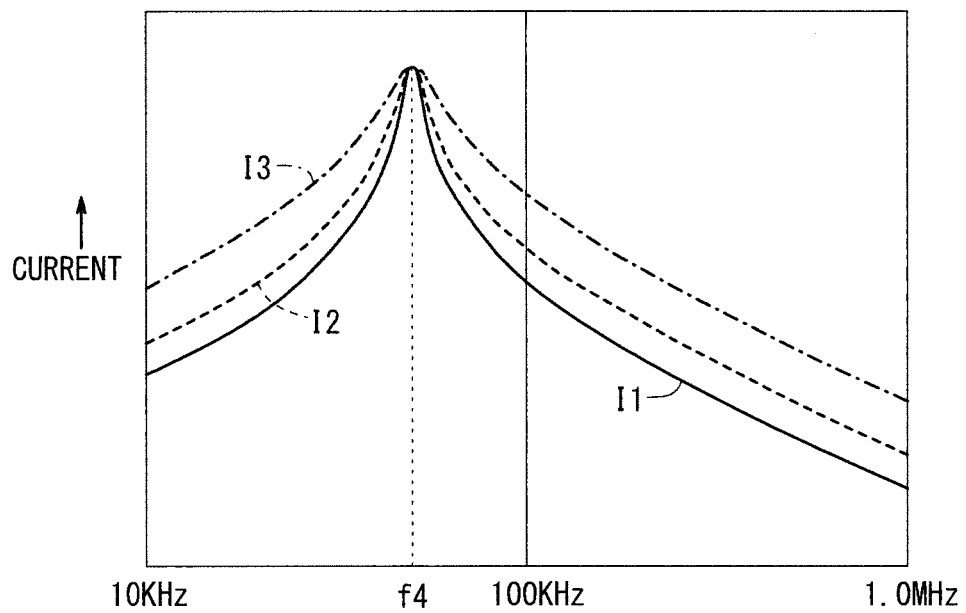
FIG. 27 is a diagram of frequency characteristics of a current gain in each of the equivalent circuits shown in FIGS. 24 through 26.

FIG. 27 is a diagram of frequency characteristics of a current gain in each of the equivalent circuits 124, 125, 126 shown in FIGS. 24, 25, and 26. The diagram has a horizontal axis representing frequency, and a vertical axis representing the current gain.

The equivalent circuit 124, which is illustrative of a process of charging the battery module E1 in the uppermost stage from the AC generating circuit PL4 of the battery module E4 in the lowermost stage, is shown in FIG. 24. The equivalent circuit 125, which is illustrative of a process of charging the battery module E2 in the second stage from the AC generating circuit PL4, is shown in FIG. 25. The equivalent circuit 126, which is illustrative of a process of charging the battery module E3 in the second stage from the AC generating circuit PL4, is shown in FIG. 25. The respective equivalent circuits comprise resonant circuits having different quantities for the L, C components (Ln, Cn) thereof.

As shown in FIG. 27, the frequency characteristics of the current gains in the equivalent circuits 124, 125, 126, which comprise LC resonant circuits as shown in FIGS. 24 25, and 26, indicate that the equivalent circuits 124, 125, 126 have the same resonant frequency f4 for peak charging current and have different current gain damping characteristics. More specifically, the equivalent circuits 124, 125, 126 shown in FIGS. 24, 25, 26 have substantially the same peak values of the respective charging currents I1, I2, I3 at the same resonant frequency f4 of the AC generating circuit PL4. If the repetitive AC frequencies of the rectangular-wave power supplies (rectangular-wave generating power supplies) EP of the AC generating circuits PL1 through PL4 for the respective battery modules E1 through E4 are set to the same value as the resonant frequency f4, then it is possible for charging and discharging routes of any combination of the battery modules En to pass charging and discharging currents of the same values, thereby making the charge voltages of the battery modules En uniform.

The frequency characteristics of the current gains shown in FIG. 27 are representative of the frequency characteristics of the current gains of the equivalent circuits 124, 125, 126, which are produced when the capacitors C1 through C6 have equal capacitances of 1 [μF], the resistors R1, R2 have resistance values of 1Ω, the inductors L1 through L6 have equal inductances of 10 [μH], and the DC resistive components of the capacitors C1 through C6 and the inductors L1 through L6 are negligibly smaller than the resistance values of the resistors R1, R2.

As can be seen from FIG. 27, since the equivalent circuits have equal resonant frequencies (f4=50.35 [kHz]) although having different Q values, if the repetitive AC frequencies of the rectangular-wave power supplies EP of the AC generating circuits PL1 through PL4 are set to the same value as the resonant frequency f4, the charging and discharging currents can be made constant, regardless of which of the battery modules En is selected to be discharged and which of the battery modules En is selected to be charged.

Figure 28:
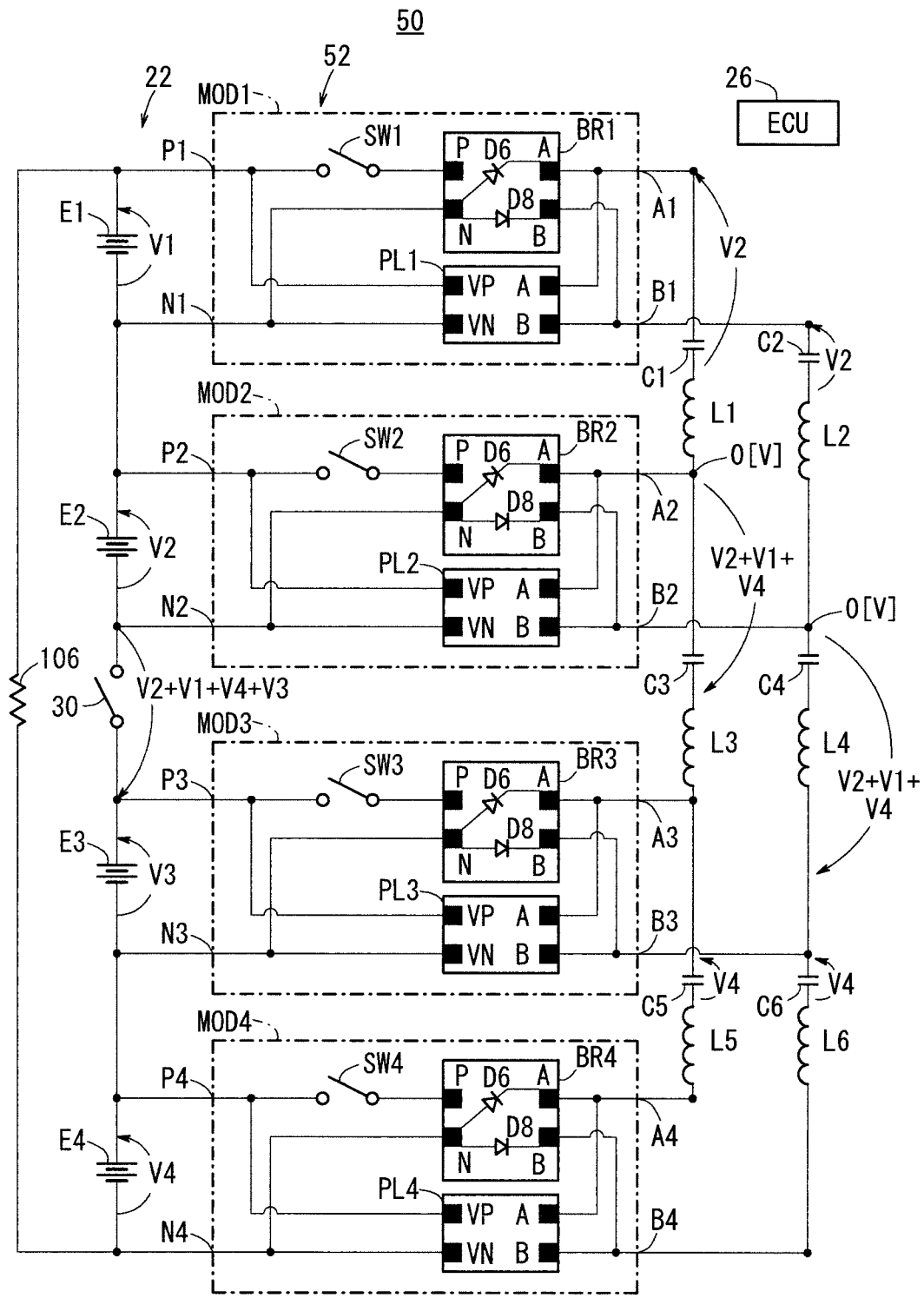
FIG. 28 is a diagram illustrating problems of Comparative Example 3.

However, with the charging and discharging device 52 according to Comparative Example 3 shown in FIG. 22, as described above with reference to FIGS. 37 and 38, if a load 106 is connected between the maximum potential of the battery assembly 22 (in FIG. 1, the potential V1+V2+V3+V4 [V], which appears at the positive terminal P1 of the battery module E1), and the minimum potential of the battery assembly 22 (in FIG. 1, the potential 0 [V], which appears at the negative terminal N4 of the battery module E4), then as shown in FIG. 28, when the cutoff switch 30 is opened, a reversed value of V2+V1+V4 is applied to the capacitors C3, C4. Actually, since there are several battery modules En, if the combined voltage thereof is several hundred V, then almost all of the reversed value is applied to the capacitors C3, C4. Consequently, the capacitors C3, C4 must function as high withstand voltage capacitors.

The arrangement and operations of Inventive Example 3 and Modifications thereof, which do not require high withstand voltage capacitors as the capacitors C3, C4 even though the battery assembly 22 includes the cutoff switch 30, will be described below. Since the basic concept of Inventive Example 3 and Modifications thereof is the same as the basic concept of Inventive Example 1 and Modifications thereof, Inventive Example 3 and Modifications thereof will only be described briefly below, rather than in detail.

[6. Description of Arrangement and Operations of Inventive Example 3]

Figure 29:
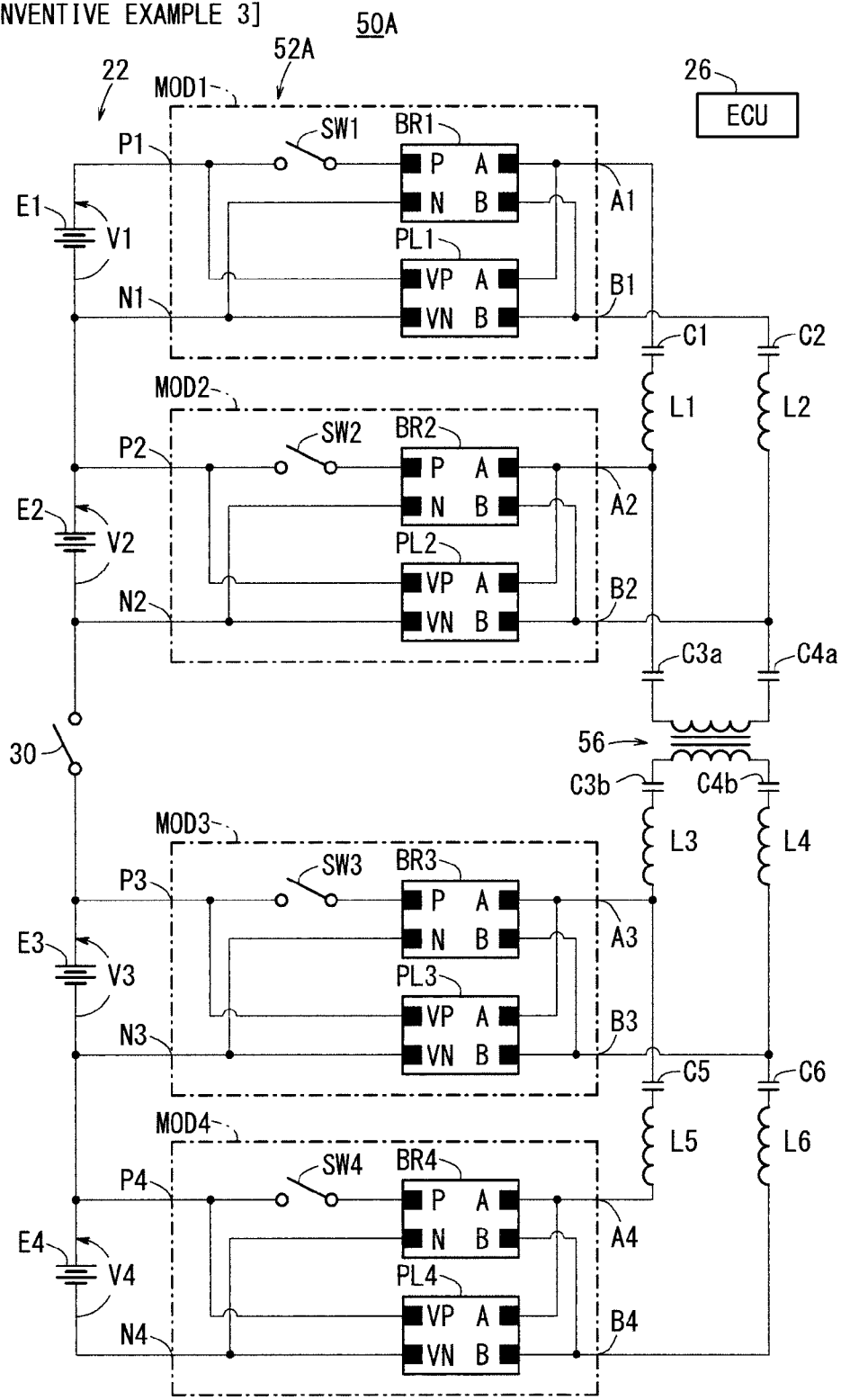
FIG. 29 is a circuit diagram of a charging and discharging device according to Inventive Example 3.

A charging and discharging device 52A of a charging and discharging system 50A according to Inventive Example 3 shown in FIG. 29 differs from the arrangement according to Comparative Example 3 shown in FIG. 22, in that the capacitors C3, C4 interconnecting the circuit block MOD2 and the circuit block MOD3 are replaced with two series-connected capacitors C3a, C3b and two series-connected capacitors C4a, C4b, respectively. Further, a transformer 56 is disposed between the pairs of capacitors.

The transformer 56 includes a primary winding having one end connected to the capacitor C3a and another end connected to the capacitor C4a. The transformer 46 includes a secondary winding having one end connected to the capacitor C3b and another end connected to the capacitor C4b.

Figure 30:
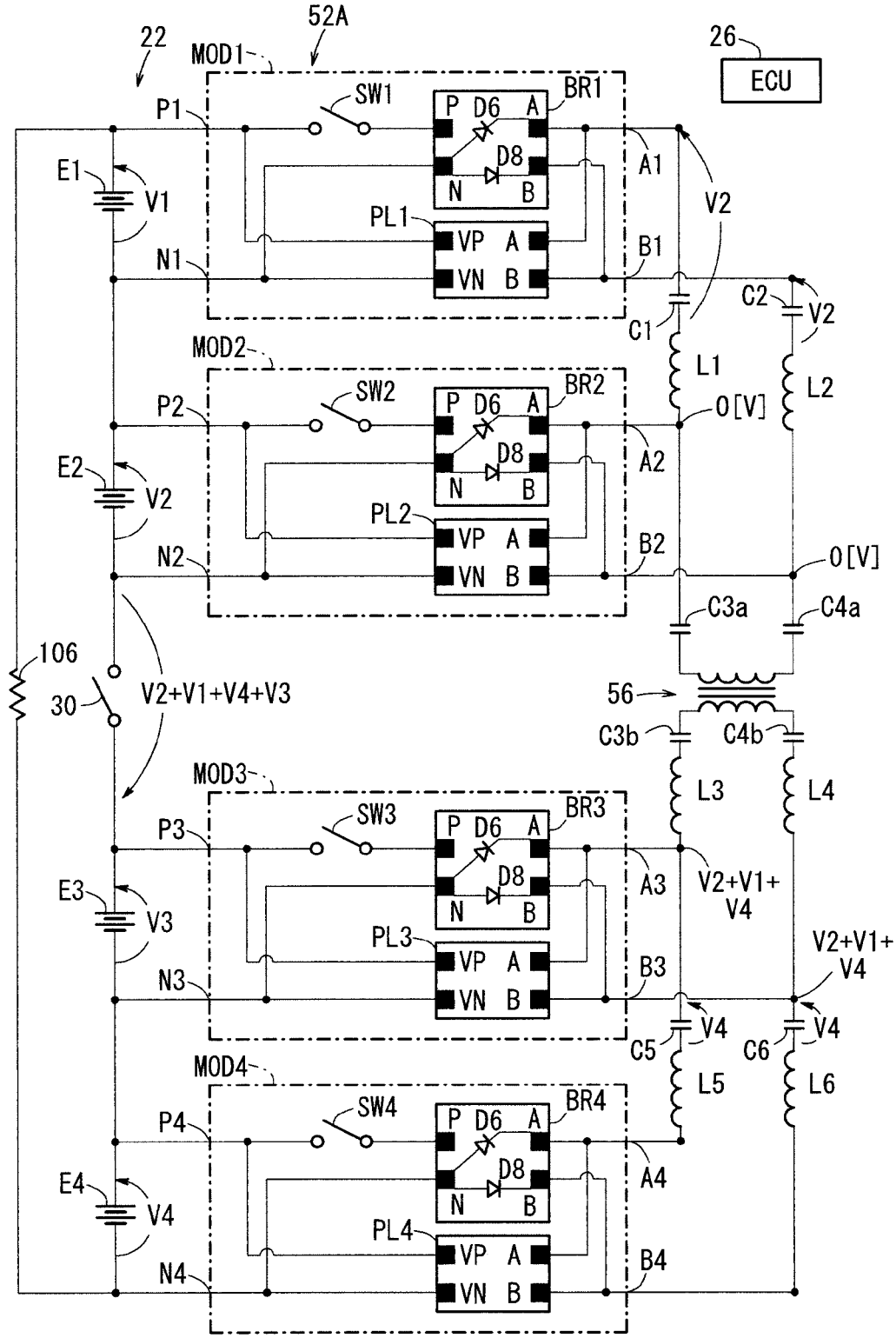
FIG. 30 is a circuit diagram of a circuit according to Inventive Example 3, illustrating an operation process for solving problems of Comparative Example 3.

If the cutoff switch 30 is opened, the alternating current transmission route is galvanically separated by the transformer 56 into a primary side and a secondary side, respectively. Therefore, as shown in FIG. 30, which illustrates the applied voltages, high voltages are not applied to the capacitors C3a, C3b, C4a, C4b.

Insofar as the capacitors are connected in series to both of the windings of the transformer 56, a DC voltage is not applied continuously to the windings of the transformer 56, regardless of the output states of the AC generating circuits PLn.

The process of discharging one of the battery modules En and the process of charging another one of the battery modules En are the same as the processes described above with respect to Comparative Example 2, and such features will not be described in detail below.

Similar to the case of Inventive Examples 1 and 2, in order to allow the charging and discharging device 52A according to Inventive Example 3 shown in FIG. 29 to operate uniformly and bidirectionally on both of the windings of the transformer 56, the transformer 56 preferably has a winding ratio of 1:1.

The transformer 56 preferably has a primary inductance and a secondary inductance, which may be selected to make the impedance sufficiently large with respect to the oscillating frequency of the AC generating circuits PLn.

Various modifications of the charging and discharging system 50A, which incorporates the charging and discharging device 52A according to Inventive Example 3 shown in FIG. 29, will be described below.

Figure 31:
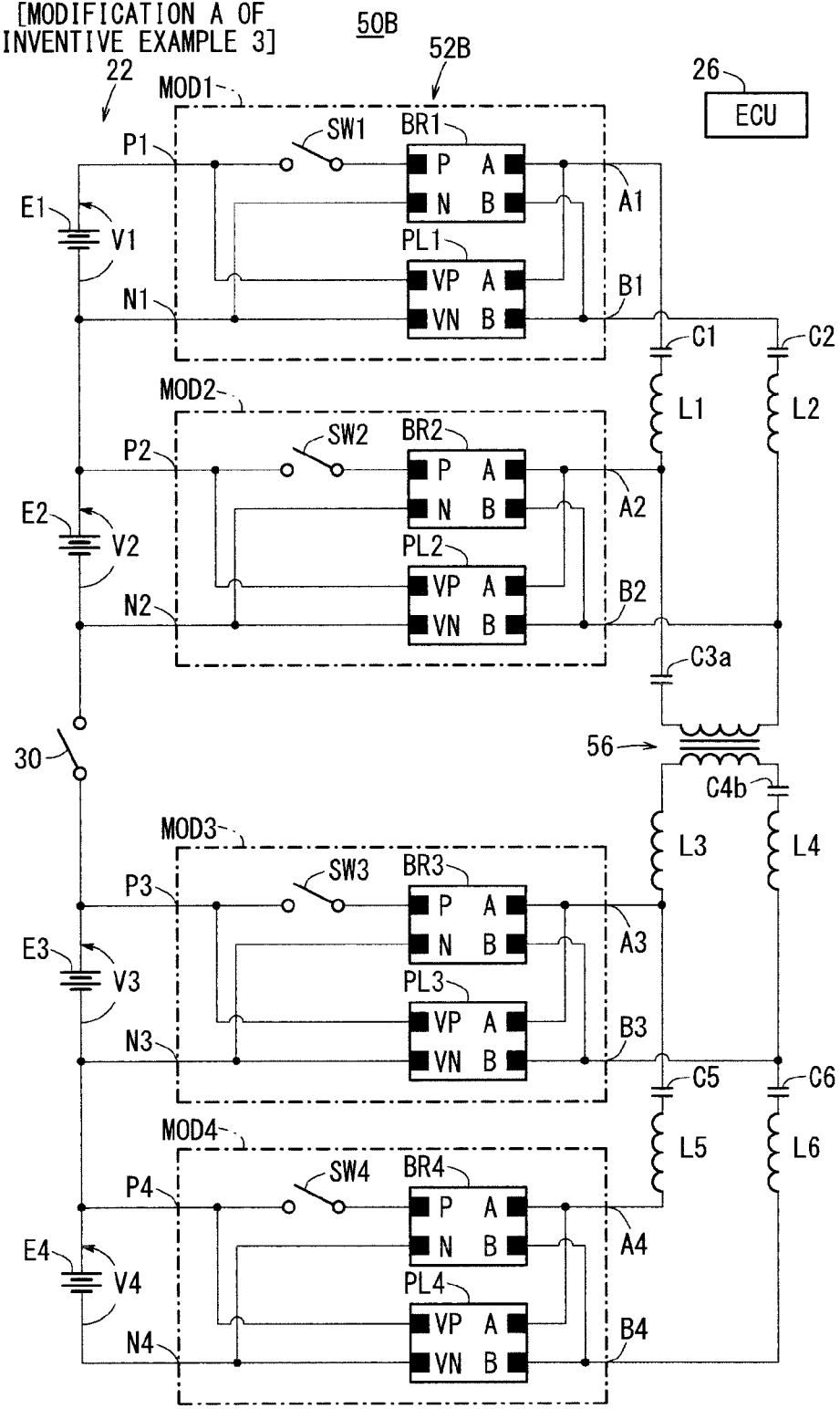
FIG. 31 is a circuit diagram of a charging and discharging system, which incorporates a charging and discharging device according to Modification A of Inventive Example 3.

FIG. 31 is a circuit diagram of a charging and discharging system 50B, which incorporates a charging and discharging device 52B according to Modification A of Inventive Example 3.

Figure 32:
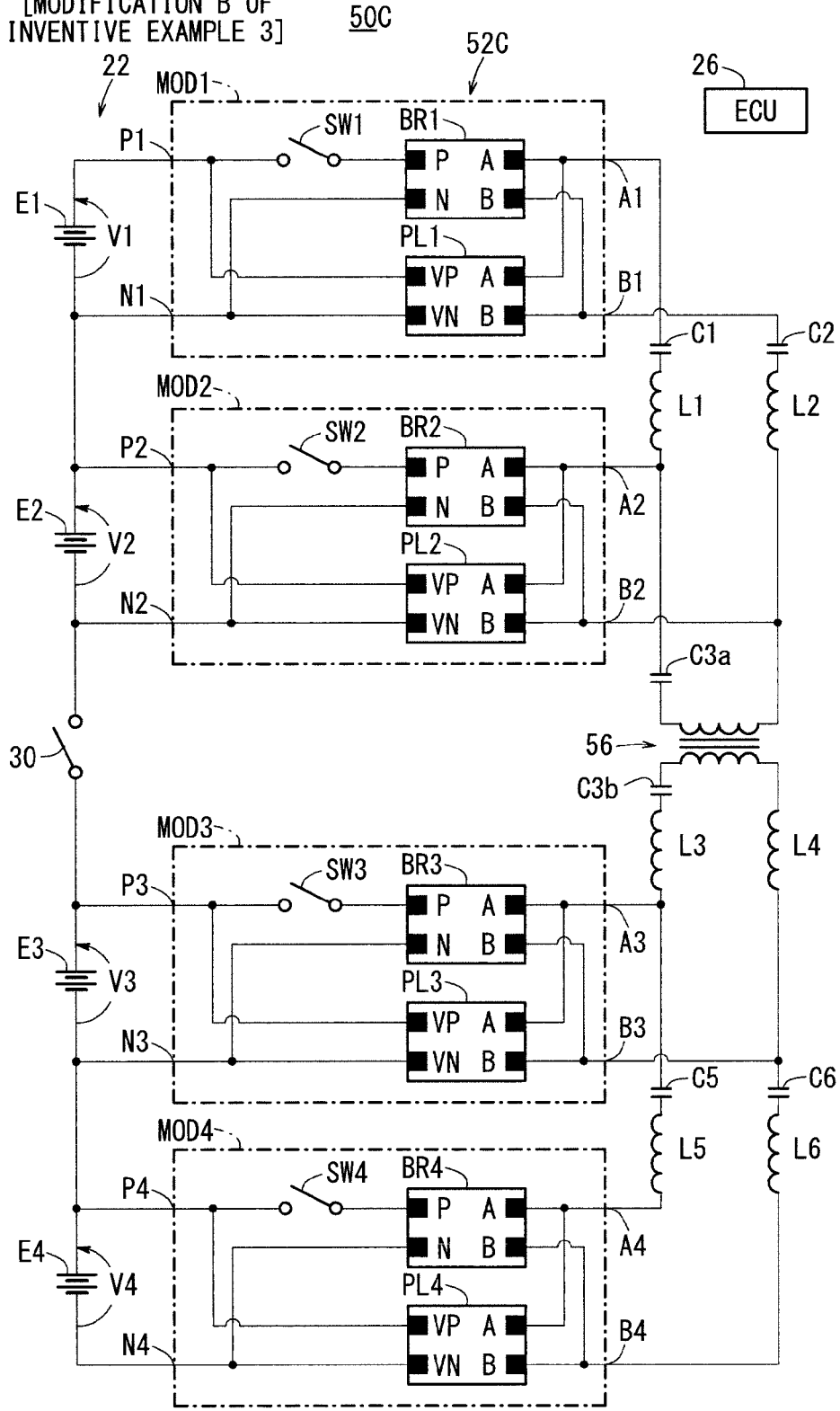
FIG. 32 is a circuit diagram of a charging and discharging system, which incorporates a charging and discharging device according to Modification B of Inventive Example 3.

FIG. 32 is a circuit diagram of a charging and discharging system 50C, which incorporates a charging and discharging device 52C according to Modification B of Inventive Example 3.

Figure 33:
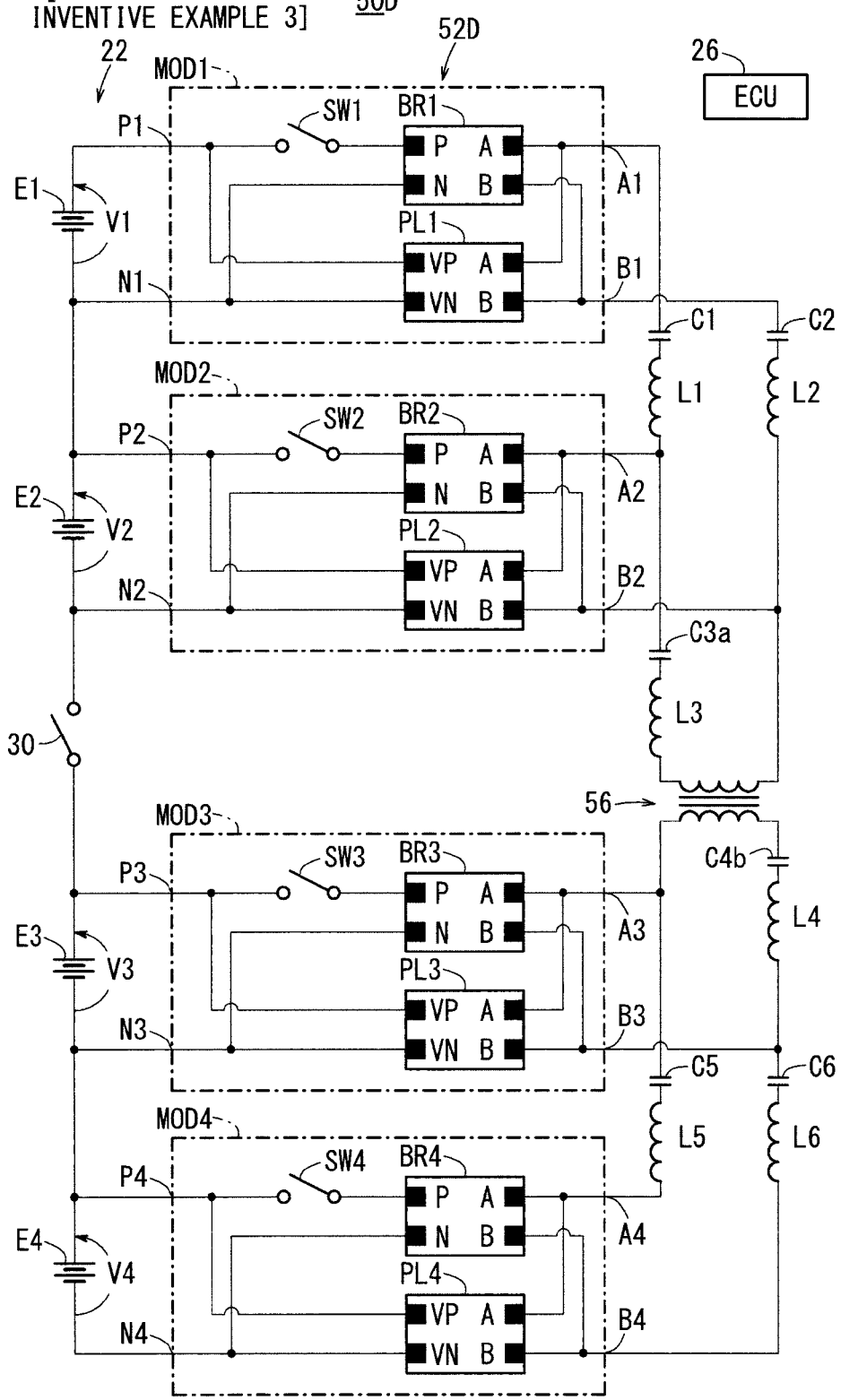
FIG. 33 is a circuit diagram of a charging and discharging system, which incorporates a charging and discharging device according to Modification C of Inventive Example 3.

FIG. 33 is a circuit diagram of a charging and discharging system 50D, which incorporates a charging and discharging device 52D according to Modification C of Inventive Example 3.

Figure 34:
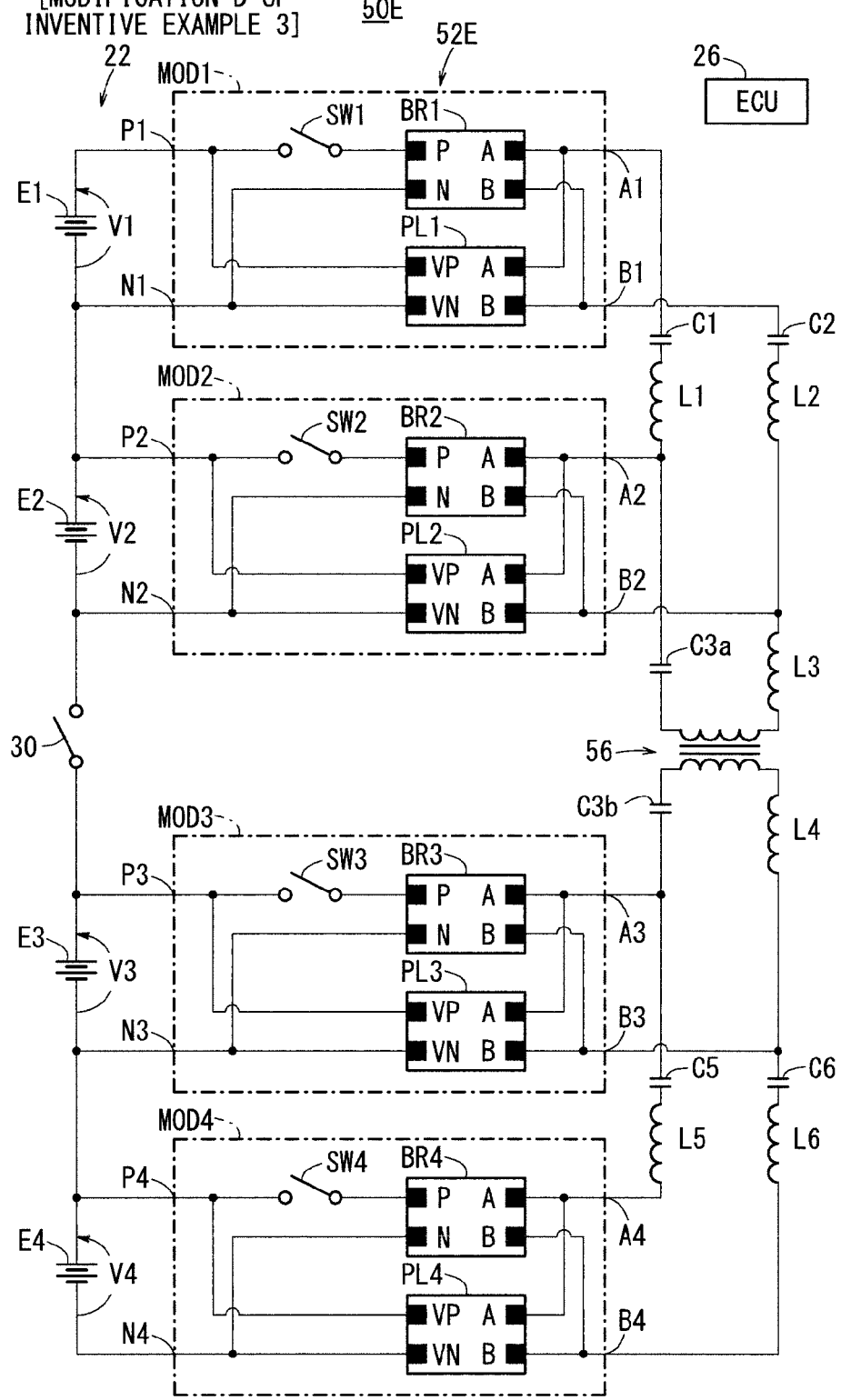
FIG. 34 is a circuit diagram of a charging and discharging system, which incorporates a charging and discharging device according to Modification D of Inventive Example 3.

FIG. 34 is a circuit diagram of a charging and discharging system 50E, which incorporates a charging and discharging device 52E according to Modification D of Inventive Example 3.

With the charging and discharging device 52A according to Inventive Example 3 shown in FIG. 29, the capacitor C3a, the primary winding of the transformer 56, and the capacitor C4a are connected in series with each other. With the charging and discharging devices 52B, 52C according to Modifications A and B of Inventive Example 3 shown in FIGS. 31 and 32, two of the capacitors may be combined together, so that either one of the capacitor C3a or the capacitor C4a may be dispensed with. Similarly, either one of the capacitor C3b or the capacitor C4b may be dispensed with.

As shown in the circuit diagram that illustrates the arrangement of the charging and discharging device 52D according to Modification C of Inventive Example 3 shown in FIG. 33, and as shown in the circuit diagram that illustrates the arrangement of the charging and discharging device 52E according to Modification D of Inventive Example 3 shown in FIG. 34, the capacitors, the inductors, and the transformer may be switched in position in order to achieve the same advantages. If the capacitors, the inductors, and the transformer are switched in position, then even if the number of components is increased or reduced, conditions may be maintained, which keep the product of the combined inductance and the combined capacitance of the AC electric path formed between any of the circuit blocks MODn constant, thereby achieving the same advantages.

For example, with the charging and discharging device 52D according to Modification C of Inventive Example 3 shown in FIG. 33, the product of the capacitance of the capacitor C5 and the inductance of the inductor L5 between the control terminal A3 and the control terminal A4, the product of the capacitance of the capacitor C6 and the inductance of the inductor L6 between the control terminal B3 and the control terminal B4, the product of the capacitance of the capacitor C4b and the inductance of the inductor L4 between the control terminal A3 and the control terminal B3, the product of the capacitance of the capacitor C3a and the inductance of the inductor L3 between the control terminal A2 and the control terminal B2, the product of the capacitance of the capacitor C2 and the inductance of the inductor L2 between the control terminal B2 and the control terminal B1, and the product of the capacitance of the capacitor C1 and the inductance of the inductor L1 between the control terminal A1 and the control terminal A2 may all be of the same value.

Similarly, with the charging and discharging device 52E according to Modification D of Inventive Example 3 shown in FIG. 34, the product of the capacitance of the capacitor C5 and the inductance of the inductor L5 between the control terminal A3 and the control terminal A4, the product of the capacitance of the capacitor C6 and the inductance of the inductor L6 between the control terminal B3 and the control terminal B4, the product of the capacitance of the capacitor C3b and the inductance of the inductor L4 between the control terminal A3 and the control terminal B3, the product of the capacitance of the capacitor C3a and the inductance of the inductor L3 between the control terminal A2 and the control terminal B2, the product of the capacitance of the capacitor C2 and the inductance of the inductor L2 between the control terminal B2 and the control terminal B1, and the product of the capacitance of the capacitor C1 and the inductance of the inductor L1 between the control terminal A1 and the control terminal A2 may all be of the same value.

According to Inventive Example 3 shown in FIG. 29, if the leakage inductance of the transformer 56 in the charging and discharging device 52A is non-negligibly large, then the leakage inductance is equivalent to a leakage inductance component inserted in series in an AC electric path made up of inductors and capacitors, so that the product of a combined inductance and a combined capacitance on an AC electric path that extends through the transformer 56 and the product of a combined inductance and a combined capacitance on an AC electric path that does not extend through the transformer 56 do not agree with each other.

In this case, the values of the inductors or the capacitors, which are disposed adjacent to the transformer 56, may be adjusted in order to achieve the same advantages.

Figure 35:
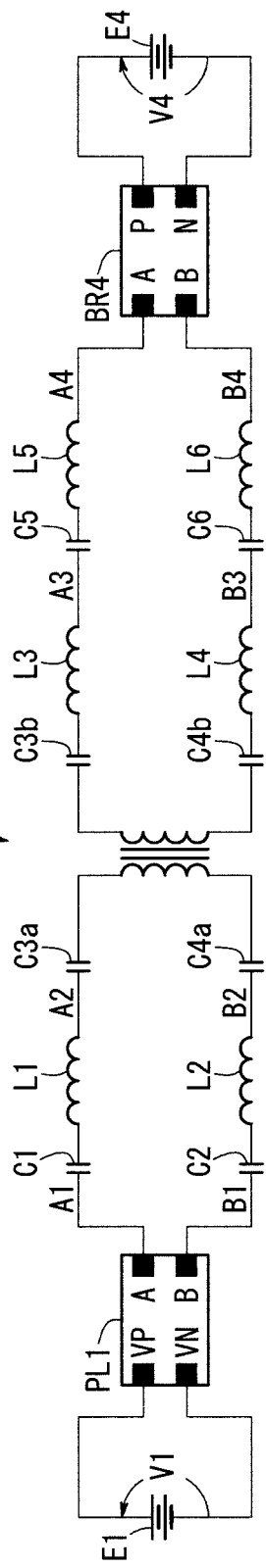
FIG. 35 is an equivalent circuit of Modification E of Inventive Example 3, with the values of inductors or capacitors being adjusted at the time that a battery module is discharged and another battery module is charged, while leakage inductance is not taken into account.

FIG. 35 is a circuit diagram of an equivalent circuit 135 according to Modification E of Inventive example 3, with the values of the inductors or the capacitors being adjusted at the time that the battery module E1 having the voltage V1 is discharged and the battery module E4 having the voltage V4 (V4<V1) is charged, while leakage inductance is not taken into account.

Figure 36:
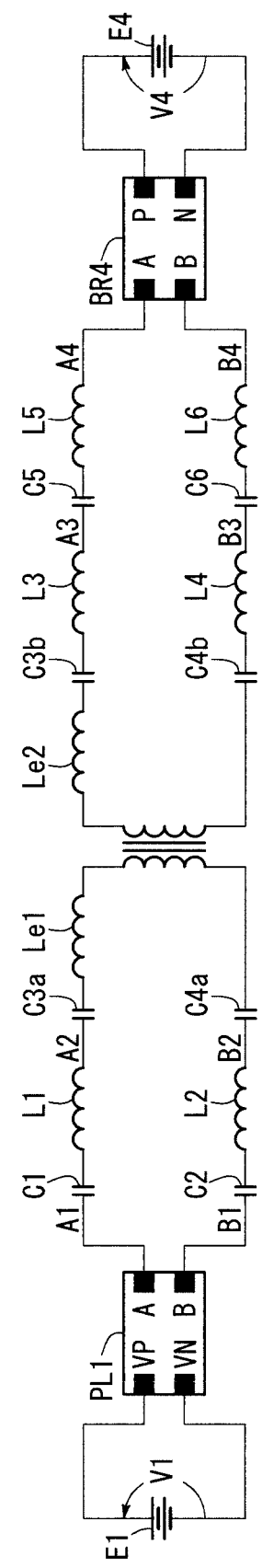
FIG. 36 is an equivalent circuit of Modification E of Inventive Example 3, with the values of inductors or capacitors disposed adjacent to a transformer being adjusted at the time that a battery module is discharged and another battery module is charged, while leakage inductance is taken into account.

FIG. 36 is a circuit diagram of an equivalent circuit 136 according to Modification F of Inventive Example 3, with the values of the inductors or the capacitors disposed adjacent to the transformer 56 being adjusted at the time that the battery module E1 having the voltage V1 is discharged and the battery module E4 having the voltage V4 (V4<V1) is charged, and while leakage inductances Le1, Le2 are taken into account.

To achieve the same advantages, instead of adjusting the values of the inductors or the capacitors that are disposed adjacent to the transformer 56, the oscillating frequencies of the AC generating circuits PLn for the AC electric path that extends through the transformer 56 and the AC electric path that does not extend through the transformer 56 may be made variable.

The present invention is not limited to the above Inventive Examples, but various arrangements may be adopted based on the disclosure of the present description.

The invention claimed is:

1. A charging and discharging device for independently adjusting charge levels of battery modules of a battery assembly, which is made up of a plurality of the battery modules connected in series, each of the battery modules comprising at least one cell, the charging and discharging device comprising:
   circuit blocks connected respectively between positive and negative terminals of the battery modules;
   the circuit blocks having:
   respective positive terminals and negative terminals connected respectively to the battery modules;
   AC generatig circuits connected respectively to the positive terminals and the negative terminals for generating AC voltages using the battery modules as electric power sources;
   rectifying circuits for rectifying the AC voltages;
   control terminals interconnecting respective outputs of the AC circuits and respective inputs of the rectifying circuits, the AC voltages being applied respectively to the control terminals;
   switching elements for selectively connecting and disconnecting at least the positive terminals or the negative terminals and respective output terminals of the rectifying circuits;
   capacitors interconnecting the control terminals of adjacent ones of the circuit blocks;
   a current cutoff switch interposed between at least one pair of adjacent ones of the battery modules; and
   an isolating transformer interposed between the control terminals that correspond to the adjacent ones of the battery modules,
   wherein an end of the isolating transformer is connected to a circuit point, which provides a reference potential,
   wherein the AC generating circuits generate other AC voltages, which are inverted in phase with respect to the AC voltages;
   the circuit blocks have other control terminals for supplying the other AC voltages;
   the rectifying circuits full-wave-rectify voltages applied between the control terminals and the other control terminals, wherein the other control terminals of the adjacent ones of the circuit blocks are interconnected by other capacitors; and
   the isolating transformer includes primary and secondary windings having ends connected to the control terminals and other ends connected to the other control terminals.

2. The charging and discharging device according to claim 1, wherein the control terminals are connected to the ends of the primary and secondary windings of the isolating transformer through inductors that are connected in series with the capacitors, and the other control terminals are connected to the other ends of the primary and secondary windings of the isolating transformer through inductors that are connected in series with the other capacitors.

* * * * *